(12) United States Patent
    Maemura et al.

(10) Patent No.: US 10,142,498 B2
(45) Date of Patent: Nov. 27, 2018

(54) IMAGE FORMING SYSTEM, INFORMATION PROCESSING APPARATUS, AND INFORMATION PROCESSING METHOD

(71) Applicants: Koichiro Maemura, Kanagawa (JP); Tomohiro Kuroyanagi, Tokyo (JP); Hiroyuki Sakuyama, Tokyo (JP); Fumiyoshi Kittaka, Kanagawa (JP); Tohru Sasaki, Kanagawa (JP); Makoto Sasaki, Kanagawa (JP); Atsushi Okazato, Kanagawa (JP); Junki Aoki, Kanagawa (JP); Takuya Mori, Tokyo (JP)

(72) Inventors: Koichiro Maemura, Kanagawa (JP); Tomohiro Kuroyanagi, Tokyo (JP); Hiroyuki Sakuyama, Tokyo (JP); Fumiyoshi Kittaka, Kanagawa (JP); Tohru Sasaki, Kanagawa (JP); Makoto Sasaki, Kanagawa (JP); Atsushi Okazato, Kanagawa (JP); Junki Aoki, Kanagawa (JP); Takuya Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/250,029

(22) Filed: Aug. 29, 2016

(65) Prior Publication Data

US 2017/0075635 A1    Mar. 16, 2017

(30) Foreign Application Priority Data

Sep. 14, 2015    (JP) .................................. 2015-181203

(51) Int. Cl.
    *G06F 3/12*    (2006.01)
    *H04N 1/00*    (2006.01)

(52) U.S. Cl.
    CPC ....... *H04N 1/00411* (2013.01); *G06F 3/1222* (2013.01); *G06F 3/1238* (2013.01); *G06F 3/1285* (2013.01); *H04N 1/00244* (2013.01)

(58) Field of Classification Search
    None
    See application file for complete search history.

(56) References Cited

U.S. PATENT DOCUMENTS 7,965,401 B2 * 6/2011 Ishimaru ................. G06F 21/35
                                                              358/1.14
2003/0072032 A1    4/2003 Maemura
(Continued)

FOREIGN PATENT DOCUMENTS

| JP | 8-328778 | 12/1996 |
|---|---|---|
| JP | 2003-152949 | 5/2003 |
| JP | 2012-018507 | 1/2012 |

OTHER PUBLICATIONS

U.S. Appl. No. 15/001,376, filed Jan. 20, 2016.
(Continued)

*Primary Examiner* — Helen Zong
(74) *Attorney, Agent, or Firm* — Harness, Dickey & Pierce P.L.C.

(57) ABSTRACT

An image forming system includes one or more image forming apparatuses and an information processing apparatus connected to the one or more image forming apparatuses through a network. The information processing apparatus includes circuitry that registers an image forming job that is received from one of the image forming apparatuses in association with information on a user who has authority to execute the image forming job, acquires information on a location of the user, determines whether or not the user is located at a first area based on the information on the location of the first user to generate a first determination (Continued)

result, and determines an operation to be performed on the image forming job based on the first determination result.

20 Claims, 26 Drawing Sheets

(56) References Cited

U.S. PATENT DOCUMENTS

| | | | |
|---|---|---|---|
| 2006/0001898 A1* | 1/2006 | Maeshima | H04N 1/00342 358/1.14 |
| 2013/0050741 A1* | 2/2013 | Raja | G06F 3/1204 358/1.15 |
| 2013/0194626 A1* | 8/2013 | Sakurai | G06F 3/1296 358/1.15 |
| 2013/0329253 A1 | 12/2013 | Sasaki | |
| 2014/0160530 A1 | 6/2014 | Kittaka | |
| 2014/0204416 A1 | 7/2014 | Kuroyanagi | |
| 2014/0362407 A1 | 12/2014 | Sasaki et al. | |
| 2015/0062612 A1* | 3/2015 | Nishii | G06F 3/1222 358/1.14 |
| 2015/0109638 A1 | 4/2015 | Sasaki | |
| 2015/0156348 A1 | 6/2015 | Kittaka et al. | |
| 2015/0264197 A1 | 9/2015 | Satoh et al. | |
| 2015/0271353 A1 | 9/2015 | Nishimura et al. | |
| 2015/0286445 A1 | 10/2015 | Kittaka | |
| 2016/0054957 A1* | 2/2016 | Sako | G06F 3/1205 358/1.15 |
| 2016/0080200 A1 | 3/2016 | Satoh et al. | |
| 2016/0080588 A1 | 3/2016 | Sasaki et al. | |
| 2016/0142406 A1* | 5/2016 | Takeuchi | H04L 63/08 726/7 |
| 2016/0150124 A1* | 5/2016 | Panda | H04N 1/442 358/1.13 |
| 2016/0173725 A1* | 6/2016 | Kato | H04N 1/4053 358/3.03 |
| 2016/0182755 A1* | 6/2016 | Saito | H04N 1/00896 358/1.14 |
| 2017/0017184 A1* | 1/2017 | Yamada | G03G 15/5016 |
| 2017/0039005 A1* | 2/2017 | Takemura | G06F 3/1205 |
| 2017/0176910 A1* | 6/2017 | Tokunaga | G03G 15/5091 |

OTHER PUBLICATIONS

U.S. Appl. No. 14/990,878, filed Jan. 8, 2016.
U.S. Appl. No. 15/062,748, filed Mar. 7, 2016.
U.S. Appl. No. 15/061,672, filed Mar. 4, 2016.

* cited by examiner

FIG. 7

| SOURCE | NETWORK TYPE | RECEIVER USER |
|---|---|---|
| KANAGAWA HEADQUARTERS | G4 | USER A |
| FUKUOKA BRANCH | G3 | USER E |
| 100. 200. 123. XX | RI-FAX (IP ADDRESS) | USER A, USER B |
| XX Co., Ltd. | G4 | USER B |
| 456 222 XXXX | RI-FAX (TSI/NSS) | USER B |
| +81 5 2223 XXXX | G3 | USER C |
| ⋮ | ⋮ | ⋮ |
| DEFAULT | − | ADMINISTRATOR |

FIG. 8

| USER NAME | DESTINATION ADDRESS | OPERATION WHEN LOCATION IS SPECIFIED | DESTINATION OF PRINTING AUTO-MATICALLY LIMITEDLY IN SPECIFYING LOCATION | NOTIFY BY E-MAIL AFTER FINISHING PRINTING AUTO-MATICALLY LIMITEDLY IN SPECIFYING LOCATION | OPERATION IF LOCATION IS UNKNOWN | OPERATION IF RECEIVER IS ABSENT | DESTINATION OF PRINTING AUTO-MATICALLY IF RECEIVER IS ABSENT | NOTIFY BY E-MAIL AFTER FINISHING PRINTING AUTO-MATICALLY IF RECEIVER IS ABSENT |
|---|---|---|---|---|---|---|---|---|
| USER A | userA@xxx.yyy | (B) PREPARE TO PRINT | - | - | (E) STORE ONLY | (G) STORE ONLY | - | - |
| USER B | userB@xxx.yyy | (B) PREPARE TO PRINT | - | - | (F) SUSPEND | (G) STORE ONLY | - | - |
| USER C | userC@xxx.yyy | (C) PRINT AUTO-MATICALLY | - | ON | (F) SUSPEND | (H) PRINT AUTO-MATICALLY SPECIFICALLY | MAIN GATE (SECURITY OFFICE) | ON |
| USER D | userD@xxx.yyy | (A) STORE ONLY | - | - | - | (H) PRINT AUTO-MATICALLY SPECIFICALLY | - | - |
| USER E | userE@xxx.yyy | (D) PRINT AUTO-MATICALLY LIMITEDLY | FIRST FLOOR, SECOND FLOOR, THIRD FLOOR | ON | (E) STORE ONLY | (I) SUSPEND | FIRST FLOOR | OFF |
| USER F | userF@xxx.yyy | (D) PRINT AUTO-MATICALLY LIMITEDLY | ALL | OFF | (F) SUSPEND | (I) SUSPEND | - | - |
| ... | ... | ... | ... | ... | ... | ... | ... | ... |

FIG. 9

| JOB ID | JOB DATA | SOURCE | AUTHORITY TO EXECUTE | CURRENT STATUS |
|---|---|---|---|---|
| 1 | JOB DATA #1 | USER A | USER A | STORED |
| 2 | JOB DATA #2 | FAX (KANAGAWA HEADQUARTERS) | USER A | READY AND WAITING ON MFP-E |
| 3 | JOB DATA #3 | FAX (FUKUOKA BRANCH) | USER E | READY AND WAITING ON MFP-A |
| 4 | JOB DATA #4 | USER B | USER B | STORED |
| 5 | JOB DATA #5 | FAX (XX Co., Ltd) | USER B | SUSPENDED |
| 6 | JOB DATA #6 | USER A | USER A | STORED |
|   |            |        | USER B | PRINTED |
| ⋮ | ⋮ | ⋮ | ⋮ | ⋮ |

FIG. 10

| AREA | ENTERING/LEAVING INFORMATION ACQUISITION APPARATUS | IMAGE FORMING APPARATUS |
|---|---|---|
| FIRST FLOOR | inpA1, inpA2 | MFP-A |
| SECOND FLOOR | inpB | MFP-B |
| THIRD FLOOR | inpC | PRN-A |
| FORTH FLOOR | inpD | PRN-B |
| MAIN GATE (SECURITY OFFICE) | inpN | MFP-N (PRINTER DURING ABSENCE) |

| USER NAME | LOCATION |
|---|---|
| USER A | IN OFFICE (FLOOR UNKNOWN) |
| USER B | ABSENT |
| USER C | ABSENT |
| USER D | FIRST FLOOR |
| USER E | SECOND FLOOR |
| USER F | THIRD FLOOR |
| ⋮ | ⋮ |

| NO. | FILE NAME | SOURCE | RECEIVED DATE/TIME |
|---|---|---|---|
| 1 | MINUTE | USER X | 2014-11-05 11:32:15 |
| 2 | FAX2 | KANAGAWA HEADQUARTERS | 2014-11-05 13:01:40 |
| 3 | FAX1 | FUKUOKA BRANCH | 2014-11-05 14:15:32 |

YOU'VE GOT PRINTED MATTER

PRINT

CANCEL

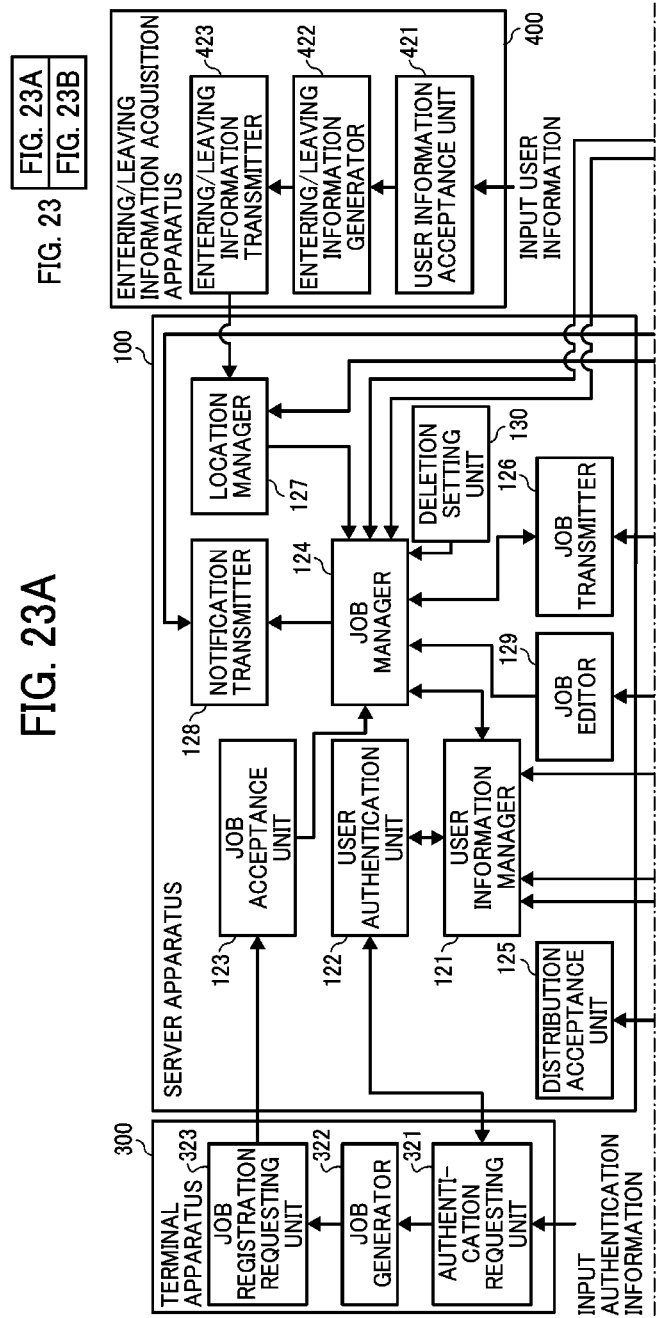

FIG. 25

| PRINTABLE JOB LIST (INCLUDING DISTRIBUTED DOCUMENT) 517 | | | | | |
|---|---|---|---|---|---|
| NO. | DISTRIBUTED | WAITING | FILE NAME | SOURCE | RECEIVED DATE/TIME |
| 1 | YES | YES | MINUTE | USER X | 2014-11-05 11:32:15 |
| 2 | YES | | FAX2 | KANAGAWA HEADQUARTERS | 2014-11-05 13:01:40 |
| 3 | YES | | FAX1 | FUKUOKA BRANCH | 2014-11-05 14:15:32 |
| 4 | | | DOCUMENT1.pdf | – | 2014-11-04 11:04:16 |
| 5 | | | QUATATION.doc | – | 2014-11-05 15:05:57 |

PREVIEW 514
PRINT 512
TRANSFER 515
DELETE 516
CANCEL 513

510
511

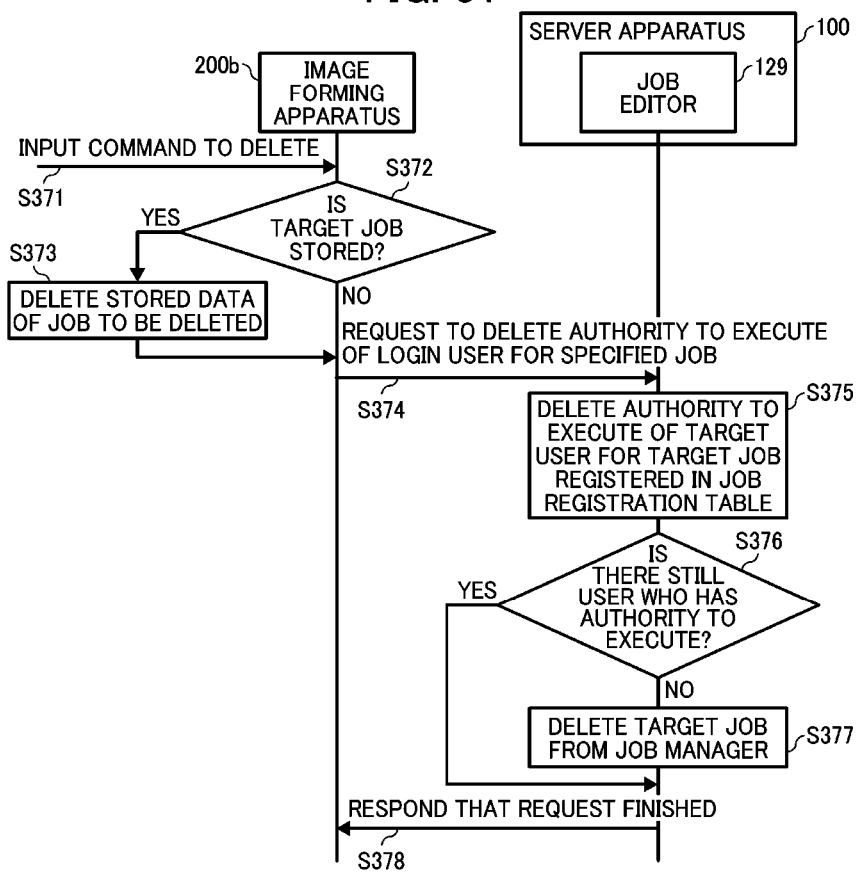

IMAGE FORMING SYSTEM, INFORMATION PROCESSING APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2015-181203, filed on Sep. 14, 2015 in the Japan Patent Office, the entire disclosures of which are hereby incorporated by reference herein.

BACKGROUND

Technical Field

The present invention relates to an image forming system, an information processing apparatus, and an information processing method.

Background Art

In the technologies called as "location free printing", print jobs generated by computers are stored in storage devices, and a printing apparatus accesses the computer to acquire information on the stored print jobs and prints a print job selected by user operation.

In other technologies, an apparatus, which receives document data by facsimile communication or e-mail etc., transfers the received document data to other apparatus such that the transferred document data can be referred to at the other apparatus.

For example, a destination to which the received data is transferred is configured associated with a source of such data and, if the data is received from a sender who is registered as the source, the data is transferred to the destination associated with the source of data.

SUMMARY

An example embodiment of the present invention provides a novel image forming system that includes one or more image forming apparatuses and an information processing apparatus connected to the one or more image forming apparatuses through a network. The information processing apparatus includes circuitry that registers an image forming job that is received from one of the image forming apparatuses in association with information on a user who has authority to execute the image forming job, acquires information on a location of the user, determines whether or not the user is located at a first area based on the information on the location of the first user to generate a first determination result, and determines an operation to be performed on the image forming job based on the first determination result.

Further embodiments of the present invention provide an information processing apparatus and an information processing method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 7 is a diagram illustrating a distribution destination table as an embodiment of the present invention.

FIG. 8 is a diagram illustrating an automatic print setting table as an embodiment of the present invention.

FIG. 9 is a diagram illustrating a job registration table as an embodiment of the present invention.

FIG. 10 is a diagram illustrating an apparatus location table as an embodiment of the present invention.

FIGS. 23A and 23B are diagrams illustrating an overall configuration of an image forming system corresponding to FIG. 6 as an embodiment of the present invention.

FIG. 25 is a diagram illustrating a job list screen as an embodiment of the present invention.

FIG. 31 is a sequence chart illustrating an operation executed by the image forming apparatus 200b and the server apparatus 100 if the image forming apparatus 200b detects a command to delete a job.

FIG. 32 is a diagram illustrating a screen of confirming deletion.

DETAILED DESCRIPTION

Figure 1:
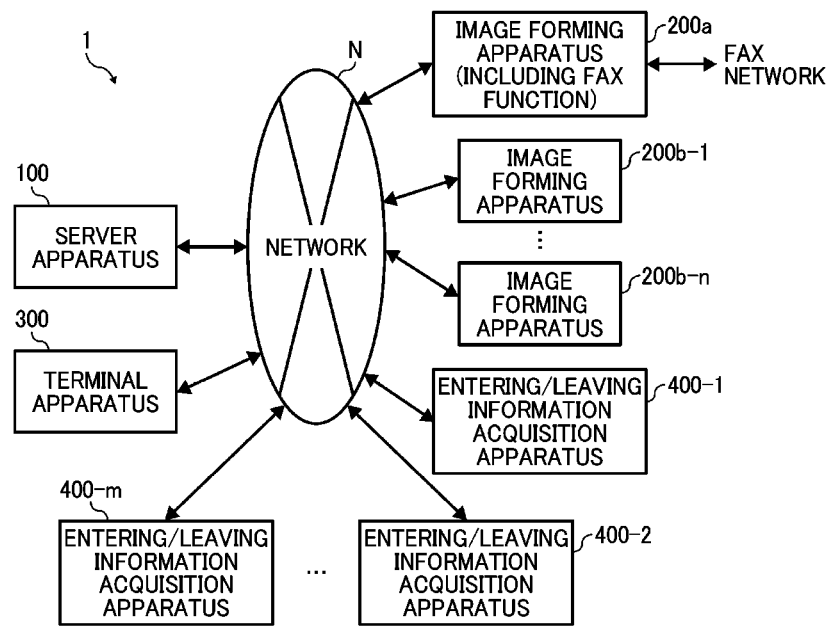
FIG. 1 is a diagram illustrating an overall configuration of an image forming system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the figures that are referred to below, the same symbols are used for the same elements and redundant descriptions are omitted.

Frequently, a user may want to transfer document data to a receiver for output onto a paper medium. For example, after transferring document data by facsimile communication, the received document data is output by a facsimile receiving machine as a print output.

Usually, one receiving machine is shared by multiple users at the receiver's side. As a result, after the receiving machine receives the document data, the received document data is further transferred to a receiver of such document data in one way or another. It is possible to transfer the printed document manually. Otherwise, it is possible to distribute the document data by transferring the document data to an image forming apparatus near the receiver or a terminal apparatus used by the receiver using a known data transfer technology. In any case, the document image is to be formed on a sheet finally, for example, by using an image forming apparatus.

However, if the document is output automatically in receiving the document or distributing the document to the receiver, the document can be browsed by the third person or taken out by the third person, increasing a security risk. This is because it is not always possible that the receiver retrieves the output document immediately since it is unclear when the document sent from the sender is received. Especially, such risk increases if the receiver is absent from a normally envisioned workplace due to a business trip or a vacation and a machine envisioned to use normally is not operated for a long period of time.

In view of the above, it is desirable that a receiver is able to have a printed document based on document data transferred by a sender, safely and easily.

FIG. 1 is a diagram illustrating an overall configuration of an image forming system in a first embodiment.

In an image forming system 1 in FIG. 1, a server apparatus 100 as an information processing apparatus is communicably connected to image forming apparatuses 200a and 200b-1 to 200b-n via a network N. In addition, a terminal apparatus 300 and an entering/leaving information acquisition apparatuses 400-1 to 400-m are connected to the network N. While the terminal apparatus 300 and the entering/leaving information acquisition apparatuses 400-1 to 400-m are shown in FIG. 1, those apparatuses may not be included in the image forming system 1.

Among the apparatuses described above, the server apparatus 100 includes a function that manages an image forming job executed by the image forming apparatus 200 (i.e., this reference number is used in case of not specifying an individual apparatus of the apparatuses 200a to 200b-n). In addition, the server apparatus 100 includes a function that manages a user location of each user based on information provided by the entering/leaving information acquisition apparatus 400 (i.e., this reference number is used in case of not specifying an individual apparatus of the apparatuses 400-1 to 400-m) and manages a layout location of each image forming apparatus 200 as information used for managing the image forming job.

The image forming apparatus 200 includes a function that acquires an image forming job from the server apparatus 100 and forms an image on paper (the material is not limited to paper) by performing printing in accordance with the acquired image forming job. The image forming job is data that specifies a content of image formation to be executed including image data to be printed and configuration data to be used in printing such as duplex, combine, and paper size etc.

The image forming apparatus described above can be configured as a printer, a facsimile communication apparatus, and a digital multifunction peripheral (MFP) etc.

Among the image forming apparatuses 200a and 200b-1 to 200b-n, the image forming apparatus 200a includes a facsimile communication (FAX) function and is connected to a FAX network. In addition to a public network, the Internet can be used as the FAX network. In case of receiving a document transferred from outside using the FAX function, the image forming apparatus 200a can generate the image forming job for printing an image in the document on paper and transfer the generated image forming job to the server apparatus 100 to register the image forming job.

The image forming apparatuses 200b-1 to 200b-n (symbol 200b is used in case of not specifying an individual apparatus of the apparatuses 200b-1 to 200b-n) are image forming apparatuses that do not include the FAX function.

The image forming apparatus 200 may include functions different from each other. For example, one apparatus can form a color image, and another apparatus can only form a monochrome image. In another example, one apparatus includes an image scanner to scan a document, and another apparatus does not include the image scanner etc.

The number of the image forming apparatus 200 that constructs the image forming system 1 is any number equal to or larger than 1. It is unnecessary to include, in the image forming system 1, both the image forming apparatus 200a with the faxing function and the image forming apparatus 200b without the faxing function.

Next, the terminal apparatus 300 includes a function that generates the image forming job (hereinafter referred to as "job" unless otherwise noted) and transfers the job to the server apparatus 100 to register the job. The terminal apparatus 300 can be configured as a generic computer such as a personal computer (PC) etc. In addition, portable devices such as a tablet computer and a smartphone etc. can be used as the terminal apparatus 300.

The entering/leaving information acquisition apparatus 400 acquires entering/leaving information indicating entering of a user into a specified area and leaving of the user from the specified area, and transfers the entering/leaving information to the server apparatus 100.

For example, the entering/leaving information acquisition apparatus 400 can be configured as a card reader located around a gateway of the specified area. In this case, a user holds an integrated circuit (IC) card in which user identification information is registered over the entering/leaving information acquisition apparatus 400 in entering into the specified area or leaving from the specified area, and the entering/leaving information acquisition apparatus 400 reads the identification information from the IC card to recognize that the user corresponding to the identification information enters into the specified area or leaves from the specified area. Subsequently, the entering/leaving information acquisition apparatus 400 transfers the recognized information to the server apparatus 100 via the network N.

The entering/leaving information acquisition apparatus 400 may read the user identification information from not only the IC card but also other media and reads the user identification information without user conscious input operation. For example, the user brings along a portable device compatible with Bluetooth, Bluetooth Low Energy (BLE), and wireless local area network (LAN) communication etc., and the entering/leaving information acquisition apparatus 400 communicates with the nearby portable device automatically using the communication function to acquire identification information of the portable device or the user identification information stored in the portable device. User biometric information such as fingerprint and vein pattern can be used as the identification information.

Alternatively, the entering/leaving information acquisition apparatus 400 determines whether or not the owner of the portable device is located at the specified area based on detection of one or more portable devices located within a communicable area from a specified position using short-range wireless communication such as Bluetooth etc. In this case, the image forming apparatus 200 and the entering/leaving information acquisition apparatus 400 may be operate in cooperation to detect a user around the image forming apparatus 200. It is possible that each of the entering/leaving information acquisition apparatus 400 uses different methods to acquire the entering/leaving information.

Any wired or wireless communication network using any protocol and any hardware can be used as the network N.

Figure 2:
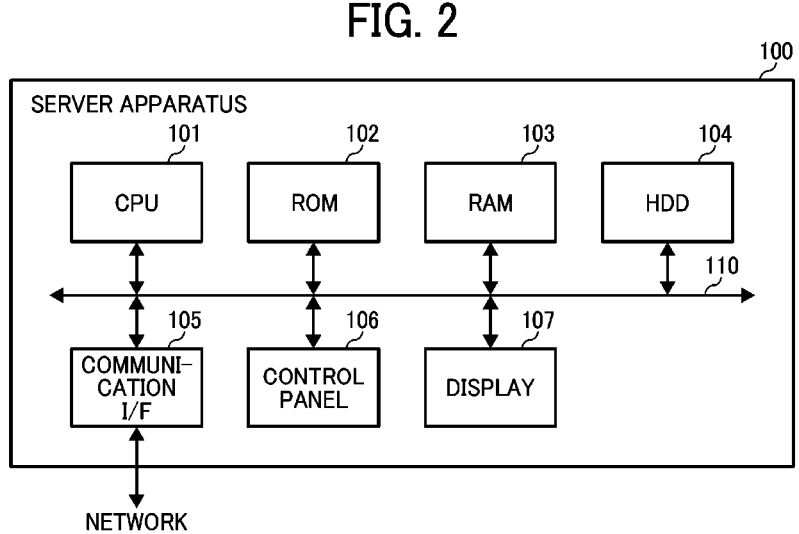
FIG. 2 is a diagram illustrating a hardware configuration of a server apparatus 100 in FIG. 1 as an embodiment of the present invention.

FIG. 2 is a diagram illustrating a hardware configuration of the server apparatus 100 in FIG. 1 in this embodiment.

As illustrated in FIG. 2, the server apparatus 100 includes a CPU 101, a ROM 102, a RAM 103, a hard disk drive (HDD) 104, a communication interface (I/F) 105, a control panel 106, and a display 107, and those components are connected with each other via a system bus 110.

The CPU 101 controls the entire server apparatus 100 by executing a program stored in the ROM 102 or the HDD 104 using the RAM 103 as a work area, and various functions (including functions described later in detail with reference to FIG. 6) can be implemented.

The ROM 102 and the HDD 104 are non-volatile storage media (storing units) and store various programs executed by the CPU 101 and various data (described in detail later).

The communication I/F 105 is an interface to communicate with other apparatuses such as the image forming apparatus 200 etc. via the network N. It is possible to use an interface that complies with a specification of the network N to be used.

The control panel 106 is an operational unit for accepting user operation. The control panel 106 includes various keys, switches, and a touch panel and accepts various user operation on a graphical user interface (GUI) displayed on the display 107.

The display 107 is an indicating unit that indicates the GUI described above, an operational condition of the server apparatus 100, configuration settings of the server apparatus 100, and various messages etc. to users, and the display 107 includes a liquid crystal display and lamps etc.

It should be noted that the control panel 106 and the display 107 can be omitted if the sever apparatus 100 does not accept user operation directly (i.e., the MFP 10 accepts user operation and displays information using an external apparatus connected via the communication I/F 105 in that case).

While specific performance can be different, it should be noted that the terminal apparatus 300 includes a similar hardware configuration as illustrated in FIG. 2.

Figure 3:
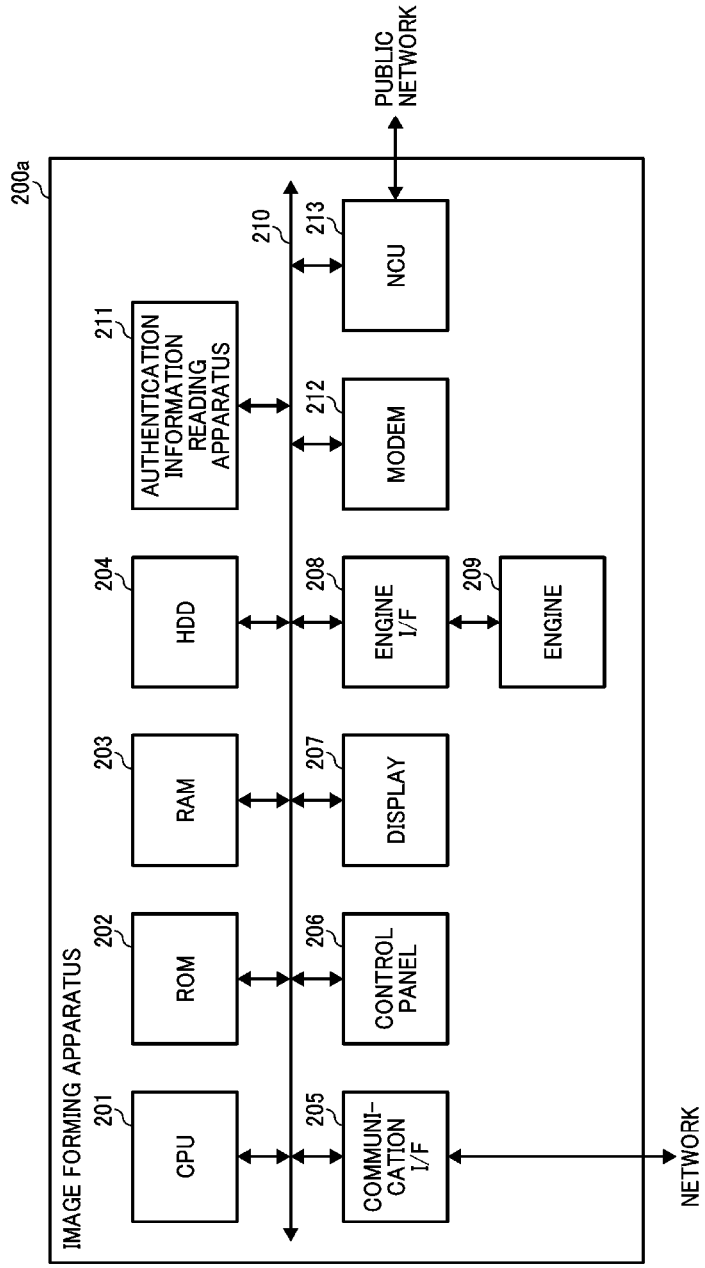
FIG. 3 is a diagram illustrating a hardware configuration of an image forming apparatus 200a in FIG. 1 as an embodiment of the present invention.

FIG. 3 is a diagram illustrating a hardware configuration of the image forming apparatus 200a in FIG. 1 in this embodiment.

As illustrated in FIG. 3, the image forming apparatus 200a includes a CPU 201, a ROM 202, a RAM 204, a communication I/F 205, a control panel 206, a display 207, an engine I/F 208, an authentication information reader 211, a modem 212, and a network control unit (NCU) 213, and those components are connected with each other by a system bus 210. In addition, an engine 209 is connected to the engine I/F 208.

Among these components, the CPU 201 to the display 207 are similar in operation and function to the CPU 101 to the display 107 illustrated in FIG. 2, such that description thereof is omitted. However, as described before, specific structures, performance such as processing performance of the CPU 201 and the size of the memory, can be different with each apparatus.

The engine I/F 208 is an interface that connects the engine 209 to the system bus 210 so that the CPU 201 can control the engine 209 through the engine I/F 208. In addition, the engine 209 is a module such as an image forming device that forms an image on paper based on the image data to implement a function including mechanical action. Structures of the engine 209 can be different with each apparatus.

The authentication information reader 211 accepts input of authentication information to authenticate a user by user operation. For example, a card reader that reads a user ID and password from the IC card can be used as the authentication information reader 211. In addition, the authentication information reader 211 can read biometric information such as a fingerprint and vein pattern etc. as the authentication information. The authentication information reader 211 can be compatible with the authentication information used for authentication.

The modem 212 is a communication device including a function to perform the FAX communication. The NCU 213 is a network controller to connect to the public network. The modem 212 performs the FAX communication using the public network via the NCU 213. Alternatively, the image forming apparatus 200a may perform the internet FAX communication using the network N and the Internet via the communication I/F 205.

Figure 4:
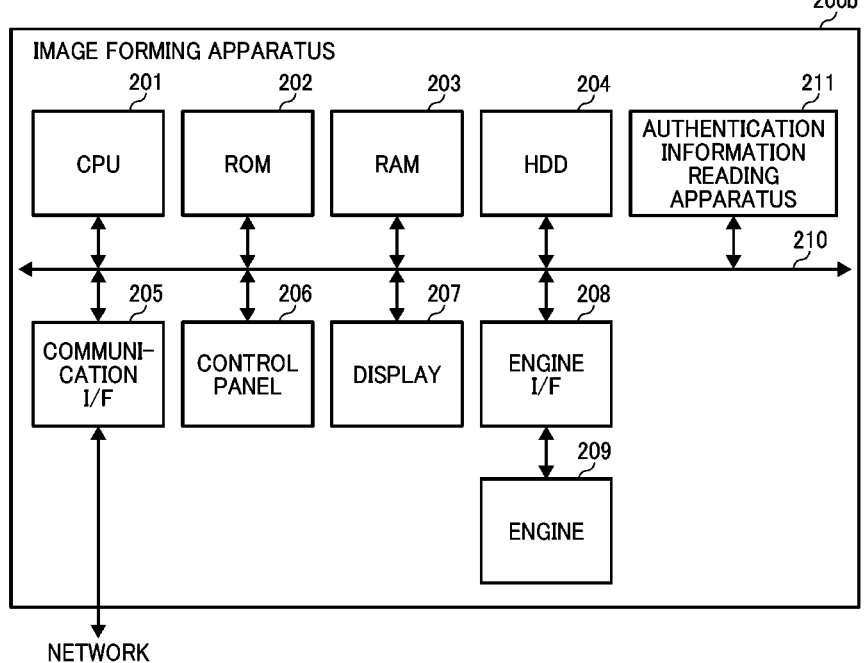
FIG. 4 is a diagram illustrating a hardware configuration of an image forming apparatus 200b in FIG. 1 as an embodiment of the present invention.

FIG. 4 is a diagram illustrating a hardware configuration of the image forming apparatus 200b in FIG. 1 in this embodiment.

Instead of the modem 212 and the NCU 213, the hardware configuration of the image forming apparatus 200b is similar in function and operation to the image forming apparatus 200a illustrated in FIG. 3. As described before, performance of each component can be different with each other.

Figure 5:
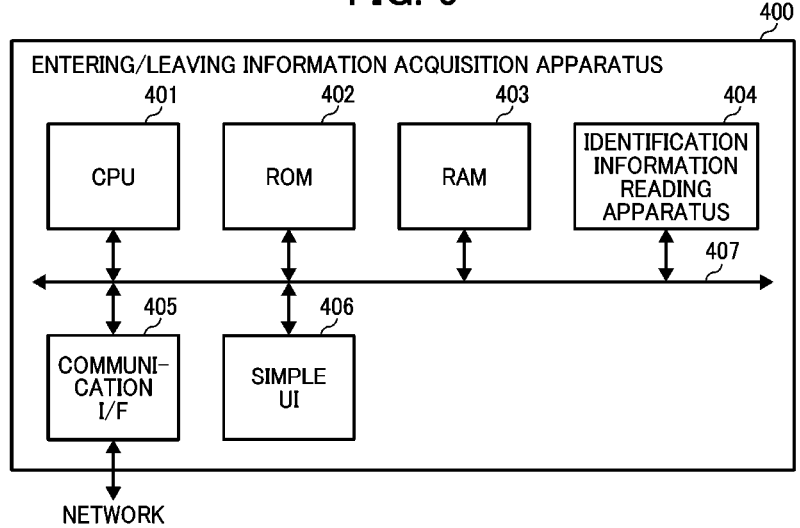
FIG. 5 is a diagram illustrating a hardware configuration of an entering/leaving information acquisition apparatus 400 in FIG. 1 as an embodiment of the present invention.

FIG. 5 is a diagram illustrating a hardware configuration of an entering/leaving information acquisition apparatus 400 in FIG. 1 in this embodiment.

As illustrated in FIG. 5, the entering/leaving information acquisition apparatus 400 includes a CPU 401, a ROM 402, a RAM 403, an identification information reader 404, a communication I/F 405, and a simple user interface (UI) 406, and those components are connected with each other by a system bus 407.

Among these components, the CPU 401 to the RAM 403 and the communication I/F 405 are similar in function and operation to the corresponding components illustrated in FIG. 2.

The identification information reader 404 reads the user identification information input or provided by user operation. As described above, various types of read identification information and reading methods can be considered. In this case, the card reader reads the user ID from a held contactless IC card.

In the image forming system described above, in registering a job in the server apparatus 100, regarding the job to be registered, an operation that is determined based on a location of the user who has execution authority of the job to be registered is performed. Operations that each apparatus performs to implement the above function is described below.

Figure 6:
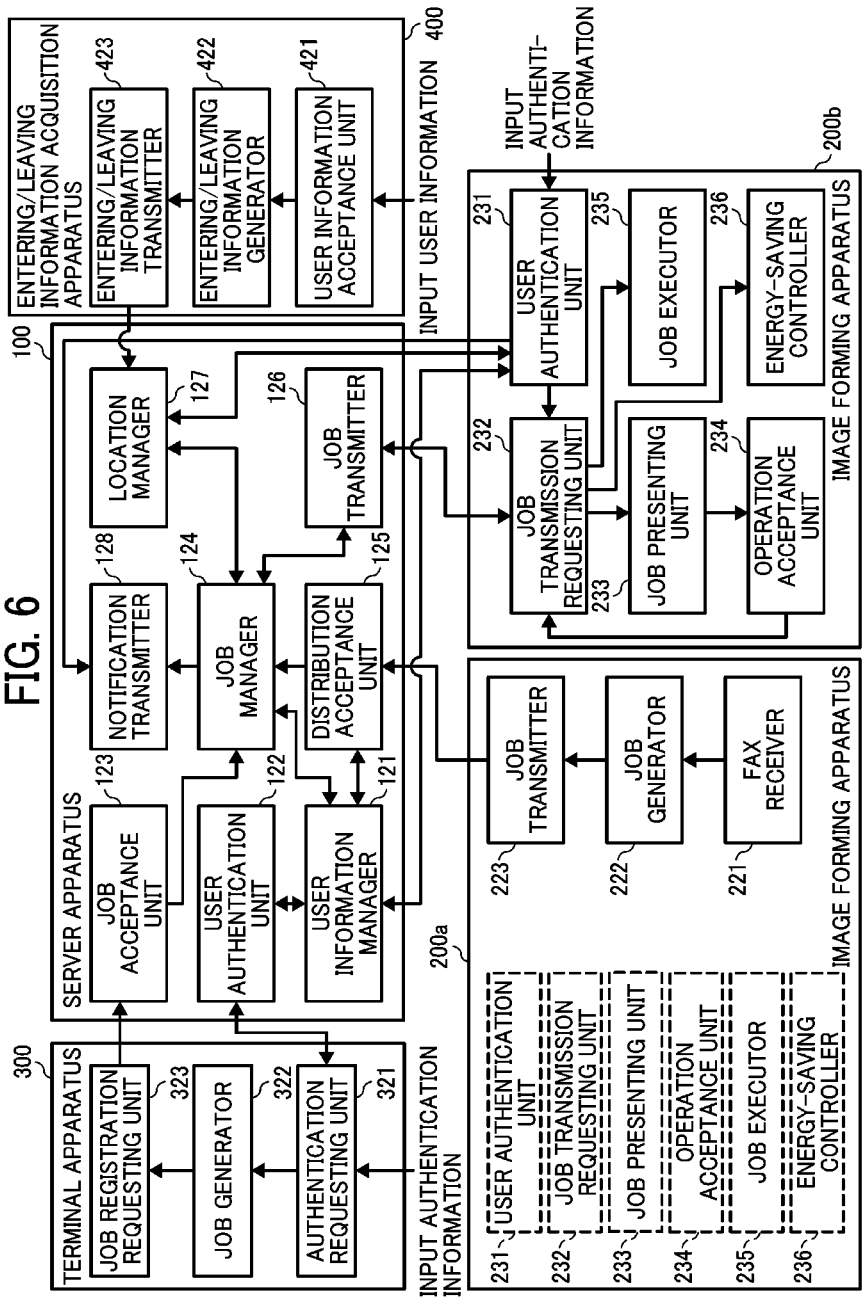
FIG. 6 is a diagram illustrating a functional configuration regarding registering a job with the server apparatus 100 and performing an operation in accordance with a location of a user who has authority to execute among functions included in the server apparatus 100, the image forming apparatuses 200a and 200b, a terminal apparatus 300, and the entering/leaving information acquisition apparatus 400 in FIG. 1.

FIG. 6 is a diagram illustrating a functional configuration of the server apparatus 100, the image forming apparatuses 200a and 200b, a terminal apparatus 300, and the entering/leaving information acquisition apparatus 400, which relates to registering a job with the server apparatus 100 and performing an operation in accordance with a location of a user who has authority to execute among functions.

As illustrated in FIG. 6, the server apparatus 100 includes a user information manager 121, a user authentication unit 122, a job acceptance unit 123, a job manager 124, a distribution acceptance unit 125, a job transmitter 126, a location manager 127, and a notification transmitter 128.

Among the components described above, the user information manager 121 manages information of a user who has authority to register the job with the server apparatus 100 and use the image forming apparatus 200. Examples of the user information are user identification information for identifying a user, authentication information for authenticating a user, and authority information that indicates user authority etc.

In addition, the user information manager 121 manages users as destinations of the document transferred by the FAX communication. In this embodiment, as illustrated in FIG. 7, in association with the document source and the type of the network used in the transmission, identification information of a user who should receive a document transferred by the document source using the network is registered in a distribution table. Data in the bottom line "DEFAULT" indicates a receiver to receive the document if no specific user is identified.

The information described above is preset by an administrator of the image forming system 1. The registered information may be stored in a storage device outside the server apparatus 100.

In accordance with a request from the job manager 124, the user information manager 121 refers to the distribution destination table to acquire the user identification information of the receiver corresponding to the information on the transmission source and the network received from the job manager 124. The user information manager 121 determines the acquired user identification information as the distribution destination of the document to notify the job manager 124 of the determined distribution destination. As illustrated in FIG. 7, it is possible that multiple users are included in the distribution destination.

Furthermore, regarding each user who has authority to use the image forming apparatus 200, the user information manager 121 manages information specifying an operation performed by the server apparatus 100 in registering a job that the user has authority to execute in the job manager 124 newly.

In this embodiment, the information is stored in an automatic printing configuration table illustrated in FIG. 8. The automatic printing configuration table is also preset by the administrator of the image forming system 1. However, it is possible that each user can modify the user's own information. It is also possible that the registered information is stored in a storage device outside the server apparatus 100.

In the automatic printing configuration table in FIG. 8, "user name" indicates a name of a user and is a part of the user identification information. It is also possible to use an ID for that purpose.

"Destination address" indicates a destination to which a notification is transferred in notifying the target user. In this case, e-mail address is used as the destination address.

"Operation when location is specified" indicates an operation that the server apparatus 100 executes if the job that the target user has authority to execute is registered newly and the user is located at a specified first area. Specifying the located area and a range of the first area is described later with reference to FIGS. 10 to 12. In configuring a value in the item, the user information manager 121 functions as a first operation configuration unit. In addition, "(A) store only", "(B) prepare to print", "(C) print automatically", and "(D) print automatically limitedly" can be configured as "operation when location is specified".

Among those items, "(A) store only" indicates that the job should only be registered without performing particular operations such as transferring the job to the image forming apparatus 200 automatically etc.

"(B) prepare to print" indicates that job data required to execute the job automatically and bibliographic information of a job required to tell the user that the job exists are transferred to the image forming apparatus 200 corresponding to the location of the target user and the job is presented to the user and the job is turned to an executable status on the image forming apparatus 200 immediately. A relation of association between the areas and the image forming apparatus 200 is defined by an apparatus location table in FIG. 10.

"(C) print automatically" indicates that the image forming apparatus 200 should execute a job in accordance with the transferred job data in addition to "(B) prepare to print".

"(D) print automatically limitedly" indicates that "(C) print automatically" is performed if it is specified that the target user is located in a predetermined second area within the first area described above and "(B) prepare to print" is performed in other cases.

Next, "destination of printing automatically limitedly in specifying location" is configured only when "(D) print automatically limitedly" is configured as "operation when location is specified" and indicates which area is to be the second area described above. In FIG. 8, regarding user E, "first floor", "second floor", and "third floor" are configured as specific area names, and regarding user F, "all" is configured indicating that each area where the image forming apparatus is located is considered as the second area among the first area described above.

"Notify by e-mail after finishing printing automatically limitedly in specifying location" is configured only when "(C) print automatically" or "(D) print automatically limitedly" is configured as "operation when location is specified" and indicates, after the image forming apparatus 200 executes the job, whether or not it is reported to the user that the job is executed and information specifying the image forming apparatus 200 is reported to the user. "On" indicates that the information is reported, and "off" indicates that the information is not reported. In addition, the server apparatus 100 reports the information described above by sending e-mail to the address configured in "destination address".

"Operation if location is unknown" indicates an operation that the server apparatus 100 executes if the job that the target user has authority to execute is registered newly, the user is located at a specified first area, and there is no image forming apparatus 200 corresponding to the user location. In configuring a value in the item, the user information manager 121 functions as a third operation configuration unit. In addition, "(E) store only" and "(F) suspend" can be configured as "operation if location is unknown".

Among them, "(E) store only" is the same as "(A) store only" described before.

"(F) suspend" indicates that a job is registered in a suspended state and an operation configured as "operation when location is specified" should be performed if the image forming apparatus 200 corresponding to the target user location is specified, i.e., it is detected that the target user enters into an area associated with any one of the image forming apparatus 200.

"Operation if receiver is absent" indicates an operation that the server apparatus 100 executes if the job that the target user has authority to execute is registered newly and the user is located at a specified first area. In configuring a value in the item, the user information manager 121 functions as a second operation configuration unit. In addition, "(G) store only", "(H) print automatically specifically", and "(I) suspend" can be configured as "operation if receiver is absent".

Among them, "(G) store only" corresponds to "(A) store only" described before, and "(I) suspend" corresponds to "(F) suspend" described before.

While "(H) print automatically specifically" is almost the same as "(C) print automatically", the job destination is the image forming apparatus 200 preset in the "destination of printing automatically if receiver is absent" field.

"Destination of printing automatically if receiver is absent" is configured only when "(H) print automatically specifically" is configured as "operation if location is unknown" and indicates the image forming apparatus 200 as the destination that the job data is transferred and the job is executed in printing automatically specifically. In FIG. 8, "destination of printing automatically if receiver is absent" is configured as a name of an area, and the name is used as information indicating the image forming apparatus 200 corresponding to the target area.

"Notify by e-mail after finishing printing automatically if receiver is absent" is configured only when "(H) print automatically specifically" is configured as "operation if receiver is absent" and indicates, after the image forming apparatus 200 executes the job transferred in accordance with the configuration of "operation if receiver is absent", whether or not it is reported to the user that the job is executed. Other than timing of reporting, the case is almost the same as the case of "notify by e-mail after finishing printing automatically limitedly in specifying location".

Next, the user authentication unit 122 functions as an authentication unit that accepts authentication information input to the server apparatus 100 directly or from an external apparatus such as the terminal apparatus 300 to authenticate user based on the accepted information with reference to user information managed by the user information manager 121. In addition, the user authentication unit 122 returns a result of authentication to the source of authentication information. It is possible to return information on a rank of authority such as an administrator and a general user along with the result of authentication.

The job acceptance unit 123 accepts a job transferred by the external apparatus such as the terminal apparatus 300 in accordance with an operation by user authenticated by the user authentication unit 122 to register the transferred job in the job manager 124. In this case, along with the job itself, the job acceptance unit 123 accepts user identification information indicating a user who has authority to execute the job and user identification information indicating a user who commands to transfer the job (i.e., the source of the job) to register the user identification information in the job manager 124 associated with the job.

For example, if a user registers a job for printing for the user himself/herself, the user who has authority to execute the job corresponds to the user who commands to transfer the job. By contrast, if a user registers a job for printing for another user, the user who has authority to execute the job is different from the user who commands to transfer the job.

The job manager 124 functions as a job registration unit that registers a job to be executed by the image forming apparatus 200 in a job registration table associated with the user identification information indicating the user who has authority to execute the job and the source information indicating the source that transfers the job to manage an executing status of the job. The registration is performed in accordance with a request from the job acceptance unit 123 or the distribution acceptance unit 125. It is possible that the registered information is stored in a storage device outside the server apparatus 100.

In addition, in case of registering the job in accordance with the request from the distribution acceptance unit 125, the job manager 124 acquires information on a network used for transferring and receiving the job from the distribution acceptance unit 125 and passes the information to the user information manager 121 to command to estimate a receiver.

FIG. 9 is a diagram illustrating a job registration table in this embodiment.

Job data in FIG. 9 is data of an image to be printed and configuration data used for printing required to execute the job. In addition, bibliographic information such as job registration date/time and the number of sheets to be printed is included in the job data. "Authority to execute" is a field for registering a user who has authority to execute the job.

"Source" is a field for registering a source that transfers the job. In addition to the user identification information described above, it is possible to register the network used for acquiring the document of the job or a name of the source of the document in "source" (described later).

In FIG. 9, since information on "authority to execute" and "source" is important in handling the job (described below), "authority to execute" and "source" are illustrated as independent items. However, it is possible to register "authority to execute" and "source" as information in parallel with other bibliographic information.

In addition, "current status" is information indicating a current status of the job such as stored, suspended, waiting in a specific MFP, and printed etc.

The job manager 124 updates the information on "current status" whenever necessary in accordance with a job transferred by itself and an executing status of the job reported by the job transmitter 126.

In addition, in case of registering a job newly in accordance with a request from the job acceptance unit 123 or the distribution acceptance unit 125, the job manager 124 functions as a controller that performs an operation configured in the automatic printing configuration table in FIG. 8 for the user who has authority to execute the registered job in accordance with the user location.

Furthermore, based on the information on user location acquired from the location manager 127 or reported by the location manager 127, the job manager 124 performs various operations including operations described before with reference to FIG. 8 for the newly registered job, suspended registered job, and job that is waiting in the image forming apparatus 200 etc. Furthermore, in accordance with the request via the job transmitter 126, the job manager 124 also provides the job data and the bibliographic information etc. to be transferred to the image forming apparatus 200. Those functions are described in detail later.

The distribution acceptance unit 125 accepts a job transferred by the image forming apparatus 200 automatically using the job transmitter 223 (described later) and passes the transferred job to the job manager 124 to command the job manager 124 to register the job. In this case, the job transmitter 223 also transfers information on the source of the received document indicated by the job and the network used for receiving the document along with the job, and the distribution acceptance unit 125 also passes the information to the job manager 124.

Since the registration that the distribution acceptance unit 125 requests is not performed in accordance with user operation, it is unnecessary that the distribution acceptance unit 125 authenticates a user in registering or accepting a job. In this regard, it is possible that the distribution acceptance unit 125 only accepts the job transferred by the preregistered image forming apparatus 200.

In accordance with a request from the job manager 124 and a request from the job manager 232 in the image forming apparatus 200, the job transmitter 126 functions as a job information transmitter and a job transmitter that transfers job data of the job registered in the job manger 124 or information on the registered job. In some cases, the job transmitter 126 transfers the whole job data required for executing the job. In other cases, the job transmitter 126 only transfers the bibliographic information for presenting an outline of the job to the user or information on the user who has authority to execute the job and the source of the job. It is possible to determine to transfer which information in accordance with the content of the request from the job manager 124 and the job manager 232.

In this regard, it is possible that the distribution acceptance unit 125 only accepts the job transferred by the preregistered image forming apparatus 200.

The location manager 127 manages current user locations based on entering/leaving information transferred by the entering/leaving information transmitter 423 in the entering/leaving information acquisition apparatus 400. For example, it is possible to manage the current user locations using an apparatus location table in FIG. 10 and a user location table in FIG. 11.

In the apparatus location table in FIG. 10, "area" indicates a name of an area as a unit of locations to manage the user locations.

"entering/leaving information acquisition apparatus" indicates identification information (or an address) of the entering/leaving information acquisition apparatus 400 that acquires entering/leaving information indicating that the user enters into the area or leaves from the area. It is possible to configure multiple entering/leaving information acquisition apparatuses 400 per one area. For example, there are multiple doorways in that case. In addition, it is possible to set up the entering/leaving information acquisition apparatus 400 that acquires information indicating that the user enter into the area and the entering/leaving information acquisition apparatus 400 that acquires information indicating that the user leaves from the area separately.

"Image forming apparatus" indicates identification information (or an address) of the image forming apparatus 200 associated with the target area. It is envisioned that the image forming apparatus 200 near to the user in that area appropriate for the user to use is associated with each area. However, it is unnecessary that the image forming apparatus 200 associated with an area is located within the area.

In addition, it is possible that there is an area that no image forming apparatus 200 is associated. In addition, it is possible that there is an image forming apparatus 200 that does not correspond to any area. (In this case, the apparatus is not registered in the apparatus location table.)

Figures 11, 12, 13:
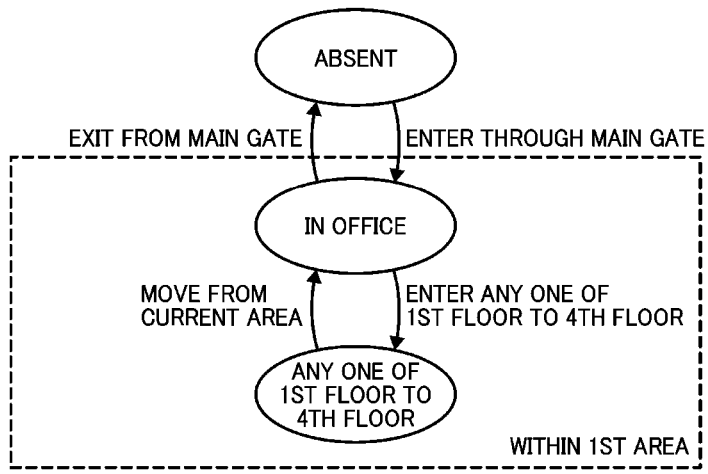
FIG. 11 is a diagram illustrating a user location table as an embodiment of the present invention.
FIG. 12 is a diagram illustrating relationship between detected entering/leaving information and updated user location.
FIG. 13 is a diagram illustrating a job list screen as an embodiment of the present invention.

In the user location table in FIG. 11, "user name" indicates a name of a user corresponding to user name in FIG. 7 etc.

"Location" is information that indicates a location where the user is located currently. If the entering/leaving information of a user is transferred by the entering/leaving information transmitter 423, the location manager 127 updates information on "location" of the user. In this case, the updated content is not always associated with the location area of the source entering/leaving information acquisition apparatus indicated in the apparatus location table one-on-one basis.

FIG. 12 is a diagram illustrating relationship between the entering/leaving information detected by the location manager 127 and the update content of the location position.

In this embodiment, as illustrated in FIG. 10, the entering/leaving information acquisition apparatuses 400 are located at a main gate of a corporation site and doorways on the first floor to the fourth floor in a building at the corporation site. Subsequently, after detecting that the user who was outside of the office and whose location was "absent" passes through the main gate, the location manager 127 changes the user location into "in office". This "in office" indicates that the user is in the corporation property and the user location in units of floor is unknown (i.e., the user is outside of room).

Next, in case of detecting that the same user enters into a room on any one of floors, the location manager 127 changes the user location into the corresponding floor. Subsequently, in case of detecting that the user exits from the room, the location manager 127 changes the user location into "in office" again. After it is detected that the user exits from the main gate, the location manager 127 changes the user location into "absent" again.

In this embodiment, the corporation property is regarded as the first area described above. If the user location is any one of "in office" and the first floor to the fourth floor, it is possible to specify that the user location be within the first area. The apparatus location table in FIG. 10, the rule of modifying user location, and information on the range of the first area in FIG. 12 are preset to the server apparatus 100 by the administrator of the server apparatus 100.

As it is known by contrasting FIG. 10 with FIG. 12, if the user location is any one of the first floor to the fourth floor, there is the image forming apparatus 200 corresponding to the user location. However, if the user location is either "in office" or "absent", there is no image forming apparatus 200 corresponding to the user location. In addition, "the main gate" is registered as an area in the apparatus location table. However, "the main gate" is not used as the location in the user location table.

The location manger 127 described above, in accordance with the request from the job manager 124, based on the content of the apparatus location table and the user location table, provides the current user location and information on the image forming apparatus 200 corresponding to the user location. In addition, if the any one of the user locations changes, the location manager 127 also provides the information to the job manager 124.

Next, the notification transmitter 128 functions as a notification unit that notifies the user in accordance with the request from the job manager 124. In this case, the notification is performed by transferring e-mail including required information to the destination address of the target user registered in the automatic printing configuration table.

Next, the terminal apparatus 300 includes an authentication requesting unit 321, a job generator 322, and a job registration requesting unit 323.

Among the components described above, the authentication requesting unit 321 passes the authentication information accepted from the user to the user authentication unit 122 in the server apparatus 100 and requests to authenticate the user based on the authentication information. In addition, in case of succeeding authentication, the authentication requesting unit 321 passes to the job generator 322 that the authentication succeeded and the user identification information.

Based on an operation of commanding to form an image accepted from the authenticated user, the job generator 322 generates an image forming job and passes the generated job to the job registration requesting unit 323. In the operation of commanding to form an image, for example, it is commanded to print a document, print settings used for printing is configured, and a user (or multiple users) who allows to execute printing is specified. In addition, the job generator 322 adds identification information of an authenticated user as source information to the image forming job and adds identification information of the specified user described above to the image forming job.

The job registration requesting unit 323 transfers the job passed by the job generator 322 to the job acceptance unit 123 in the server apparatus 100 to register the job in the job manager 124. In addition, user identification information indicating the source user and the user who has authority to execute is transferred along with the transferred job.

As described above, in accordance with the authenticated user operation, the terminal apparatus 300 can register the job specifying the user who has authority to execute in the server apparatus 100. In the registration, if the authenticated user is the same as the user who has authority to execute, the document that the user himself/herself wants to acquire in paper medium format is registered. If the authenticated user is different from the user who has authority to execute, the document that the user wants to distribute to another user is registered.

Next, the image forming apparatus 200*a* includes a FAX receiver 221, a job generator 222, and a job transmitter 223.

Among these components described above, the FAX receiver 221 receives a document form an external apparatus via the facsimile network as a specific communication network and pass the document itself, the source information, and information on the network used for receiving the document to the job generator 222. It should be noted that it is possible to acquire the source information from the transmission source terminal (e.g., source identification information and mail address etc.) and from the communication path (e.g., number display and IP address etc.). One or more number of acquisition method can be adopted appropriately.

The job generator 222 generates and acquires the image forming job to print the document received by the FAX receiver 221 to pass the job to the job transmitter 223. The information on the source of the document and the network used for receiving is added to the job. The information received by the FAX receiver 221 can be used as the information on the source as is. Otherwise, it is possible to process the received information in one way or another. In this regard, the source information is transferred so that the user information manager 121 can contrast with the source in the distribution table.

The job transmitter 223 transfers the job passed by the job generator 222 of the distribution acceptance unit 125 in the server apparatus 100 to register the job in the job manager 124. In addition, the information on the source and the network used for receiving is transferred along with the job.

By using the components described above, in case of acquiring the job via the specific communication network, the image forming apparatus 200*a* can transfer the job and the information required to estimate the receiver to the server apparatus 100. The FAX receiver 221 to the job transmitter 223 functions as a job transmitter.

Next, the image forming apparatus 200*b* includes a user authentication unit 231, a job manager 232, a job presenting unit 233, an operation acceptance unit 234, a job executor 235, and an energy-saving controller 236.

Among these components, the user authentication unit 231 accepts inputting authentication information by user operation and refers to user information managed by the user information manager 121 in the server apparatus 100 to authenticate the user based on the accepted information. In inputting the authentication information, it is possible to input the information by reading required information using the authentication information reading apparatus 211, or it is possible to input the information by user operation using the control panel 206 manually. In addition, it is possible that the user authentication unit 231 passes the authentication information to the user information manager 121 to authenticate the user and acquires the authentication result.

In case of succeeding the authentication using the authentication information, the user authentication unit 231 further verifies position information (with reference to FIG. 20) and check that the user who inputs the authentication information is not impersonating. If the authentication succeeds and the user is not impersonating, the user authentication unit 231 let the user who inputs the authentication information log in and reports to the job manager 232 that the user logs in and the identification information of the login user.

The job manager 232 functions as a holding unit that holds the job data and the bibliographic information of the job transferred by the job manager 124 via the job transmitter 126. In addition, in accordance with the command to execute the job transferred by the job manager 124, the job manager 232 functions as an executing unit that executes the job based on the holding job data.

Furthermore, if the user authentication unit 231 lets the user log in, the job manager 232 functions as a job information requesting unit that requests the job transmitter 126 in the server apparatus 100 to transfer information on a job that the login user has authority to execute among the jobs registered in the job manager 124. Here, the information requested to transfer is bibliographic information on a job required to present existence of the job.

In addition, the job manager 232 passes the bibliographic information of the job transferred in accordance with the request to the job presenting unit 233 to present the existence of the job to the user. In this embodiment, the job that the login user has authority to execute held by the job manager 232 already is executed automatically (with reference to FIG. 21), and the execution itself corresponds to the presentation.

In addition, as described later, regarding a job that the operation acceptance unit 234 accepts a command to execute by user operation, the job manager 232 requests the job transmitter 126 to transfer the job data. Subsequently, the job manager 232 passes the job data received in response to the request to the job executing unit 235 to execute the job based on the job data. This operation is common regardless of the source of the job.

Next, based on the bibliographic information of the job passed by the job manager, the job presenting unit 233 presents a job registered in the server apparatus 100 to the user. For example, it is possible to present the job by displaying a screen on a display 207. Regarding a job different from the user authenticated by the source, just after inputting the authentication information from a viewpoint of the user, the job is presented before displaying the normal top screen. In addition, in this embodiment, regarding the job whose job data is held by the job manager 232, the job is executed automatically just after inputting the authentication information from the viewpoint of the user. Therefore, even if the job is registered in the server apparatus 100, it is unnecessary to present the job by displaying the job on the screen anew. However, to present the bibliographic information of the executed job, it is possible to display the job on the screen perceptively.

FIG. 13 is a job list screen to present the job as described above.

A job list screen 510 is a screen to present the job whose job data is held by the job manager and the job whose user is different from the user authenticated by the source and includes a list display part 511, a print button 512, and a cancel button 513.

The list display part 511 indicates the bibliographic information for each job transferred by the job transmitter 126.

Among these components described above, "No." is a serial number of a displayed job. "File name" indicates a file name of a document commanded to be printed. Regarding a document received via the FAX network, the image forming apparatus 200a adds the file name automatically in generating the job. In FIG. 13, file name "FAX2" or "FAX1" corresponds to the file name added automatically. The source is information of the source of the job corresponding to the source illustrated in FIG. 7. Regarding a job generated in accordance with receiving a document via the FAX network, it is possible to display the fact. "Received date/time" is date/time when the job is registered in the job manager 124.

Furthermore, in addition to the items described above, it is possible to display information such as a file name and the number of sheets to make a content of an image to be formed clear. Since the stored job can be executed immediately, it is possible to display the stored job preferentially by emphasizing the stored job compared to other jobs or laying out the stored job at an upper part.

By touching a line corresponding to each job on the list display part 511 by user operation, it is possible to toggle the status of the job on that line between selected and unselected.

The print button 512 is a button to command to execute printing the selected job.

The cancel button 513 is a button to close the job list screen 510 to transition to a function selecting screen (described later with reference to FIG. 22) as a normal top screen.

In the print function is selected on the function selecting screen, the job presenting unit 233 can display jobs and accept a command to execute a job on a similar screen for all jobs that the authenticated user has authority to execute.

The operation acceptance unit 234 accepts user operations on the screen displayed by the job presenting unit 233. In addition, if a command to execute a job and transition a screen is detected, the operation acceptance unit 234 notifies the job manager 232 of the command.

The job executor 235 controls the engine 209 in accordance with the job data passed by the job manager 232 to execute the job.

The energy-saving controller 236 manages the image forming apparatus 200b so that the image forming apparatus 200b operates in the energy-saving mode that cuts supplying power to unnecessary parts and operates with the minimum power consumption or in the normal mode that the image forming apparatus 200b operates normally and controls supplying power in accordance with the managed mode.

By using the units described above, among jobs that the user authenticated by the user authentication unit 231 has authority to execute, the image forming apparatus 200b can present the job whose job data is stored by the job manager 232 and the job whose source is different from the authenticated user to the authenticated user in preference to other jobs. In addition, it is possible to execute a job selected by user operation among the presented jobs.

It should be noted that the image forming apparatus 200a includes the user authenticating unit 231 to the energy-saving controller 236 similar to the image forming apparatus 200b in addition to the FAX receiver 221 to the job transmitter 223.

Next, entering/leaving information acquisition apparatus 400 includes a user information acceptance unit 421, an entering/leaving information generator 422, and an entering/leaving information transmitter 423.

Among the components described above, the user information acceptance unit 421 accepts input of the identification information for identifying the user. As described before, it is possible to adopt the type of the identification information and to accept inputting the identification information in discretionary way.

Based on the identification information acquired by the user information acceptance unit 421, the entering/leaving information generator 422 generates the entering/leaving information indicating that a specific user enters into an area corresponding to the entering/leaving information acquisition apparatus 400 or the specific user leaves from the area. For example, if the user identification information is read by the card reader outside the area, the entering/leaving information indicating that the user enters into the area is generated. By contrast, if the user identification information is read by the card reader inside the area, the entering/leaving information indicating that the user leaves from the area is generated.

It is possible that the entering/leaving information indicates that the user only steps over a border between the areas. In this case, in the server apparatus 100, based on the current user location, the location manager 127 may determine whether the user enters into the area or the user leaves from the area by the user move.

The entering/leaving information transmitter 423 transfers the entering/leaving information generated by the entering/leaving information generator 422 to the server apparatus 100 as a preset destination. In the server apparatus 100, the location manager 127 receives the entering/leaving information.

The functional configuration of each apparatus included in the image forming system 1 is described above.

Next, operations performed by each apparatus illustrated in FIG. 6 are described below in detail.

Figure 14:
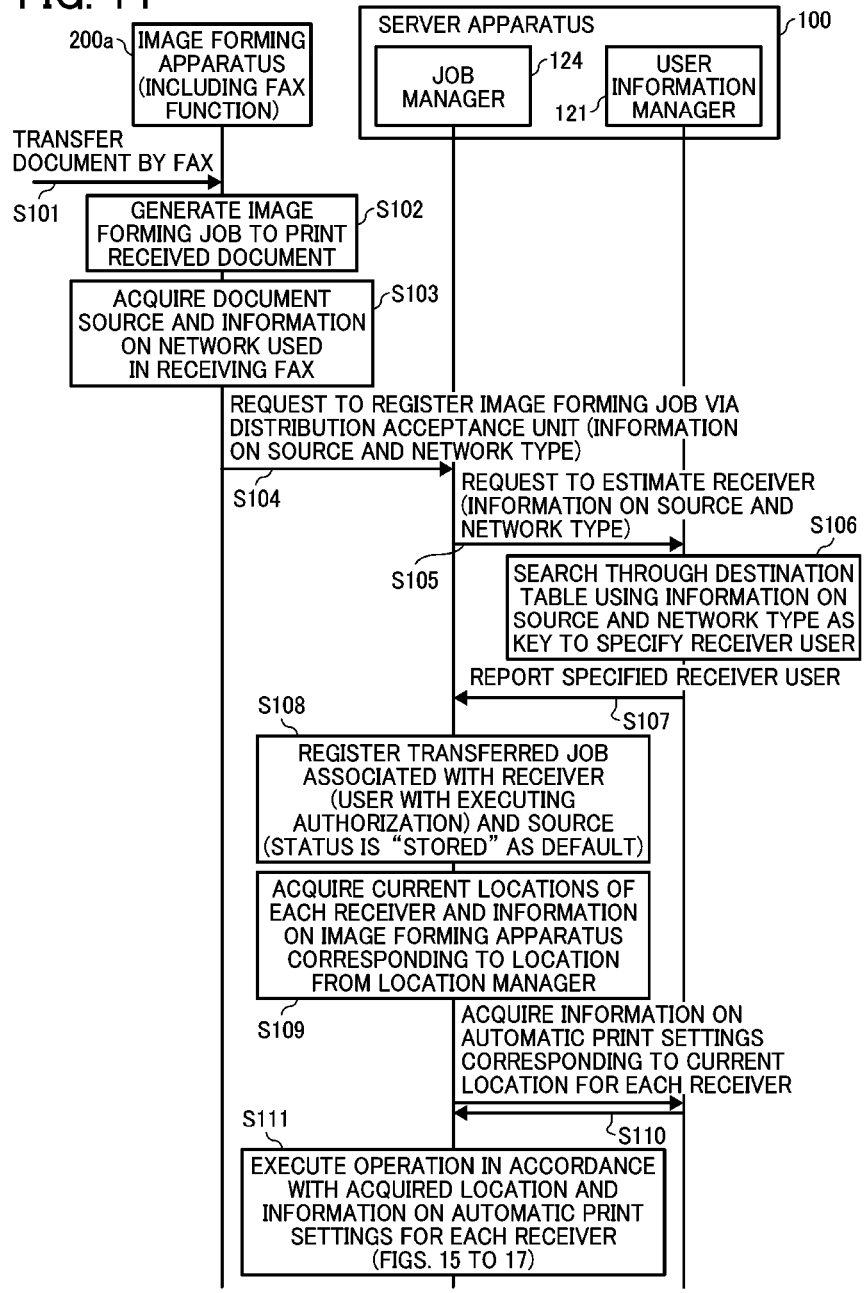
FIG. 14 is a sequence chart illustrating an operation executed by the image forming apparatus 200a and the server apparatus 100 if a FAX receiver 221 receives a document.

First, FIG. 14 is a sequence diagram illustrating an operation executed by the image forming apparatus 200*a* and the server apparatus 100 when a FAX receiver 221 in the image forming apparatus 200*a* receives a document.

The operation in FIG. 14 is performed by the CPU 201 in the image forming apparatus 200*a* and the CPU 101 in the server apparatus 100 that operate in cooperation.

When the FAX receiver 221 in the image forming apparatus 200*a* receives a document via the FAX network in S101, the image forming apparatus 200*a* starts an operation illustrated in FIG. 14. First, an image forming job to print the received document on paper is generated by the job generator 222 in S102, and the source information indicating the document source and the information on the network type indicating the network used for receiving the document are acquired in S103. S102 and S103 may be performed in any order.

Next, in the image forming apparatus 200*a*, the job transmitter 223 transfers the job generated in S102 and the source information and the network type acquired in S103 to the server apparatus 100 to request to register the job.

In the server 100, the distribution acceptance unit 125 accepts the request and passes the request to the job manager 124. After receiving the request to register the job, the job manager 124 passes the source information and the network type included in the request to the user information manager 121 to request to estimate a receiver in S105. After receiving the request, the user information manager 121 searches through the distribution destination table in FIG. 7 to specify a receiver user in S106 and reports to the job manager 124 in S107.

After receiving the notification in S107, in S108, the job manager 124 registers the image forming job transferred in S104 in the job registration table in FIG. 9 associated with the receiver information reported in S107 and the source information transferred in S104. The receiver described above is registered as the user who has authority to execute the job. The initial value of the job status is "stored" indicating that the job is registered in the job manager 124.

Next, the job manager 124 acquires current locations of the receivers registered in S108 and information on the image forming apparatuses corresponding to the locations from the location manager 127 in S109. The user location is information registered in the user location table in FIG. 11. The information on the image forming apparatus corresponding to the location is information registered in the apparatus location table in FIG. 10.

Next, for each receiver, based on the location acquired in S109, the job manager 124 acquires information on automatic print settings corresponding to the location in S110. The information is registered in the automatic print setting table in FIG. 8.

In this case, if the user is located at the first area and the image forming apparatus 200 corresponding to the user location can be specified, it is considered that the user location is specified and settings for "operation when location is specified" is acquired. Otherwise, if the user is located at the first area and the image forming apparatus 200 corresponding to the user location cannot be specified, it is considered that the user location is unknown and settings for "operation if location is unknown" is acquired. If the user is not located at the first area, it is considered that the user is absent and settings for "operation if user is absent" are acquired. In addition, settings such as destination for printing automatically and whether or not it is required to notify by e-mail are acquired.

Next, for each receiver, in S111, the job manager 124 performs an operation in accordance with the location acquired in S109 and the information on automatic print settings acquired in S110. Particular contents of the operations are illustrated in FIGS. 15 and 17 for each case.

In the operation described above, S108 is the operation for registering the job, and the job manager 124 functions as a job registering unit. S109 is the operation for acquiring the location information, and the job manager 124 functions as a location information acquisition unit. S111 is the operation for controlling, and the job manager 124 functions as a controller.

As described above, in case of acquiring the job via the facsimile network as the specific communication network, the image forming apparatus 200*a* can determine the user who has authority to execute the job and register the job in the server apparatus 100 associated with the user who has authority to execute the job and the job source. Furthermore, regarding the job to be registered, it is possible to perform the operation corresponding to the location of the user who has authority to execute the job at the time of the registration. The operation varies depending on whether or not it is specified that the user location be in the first area at least.

Figure 15:
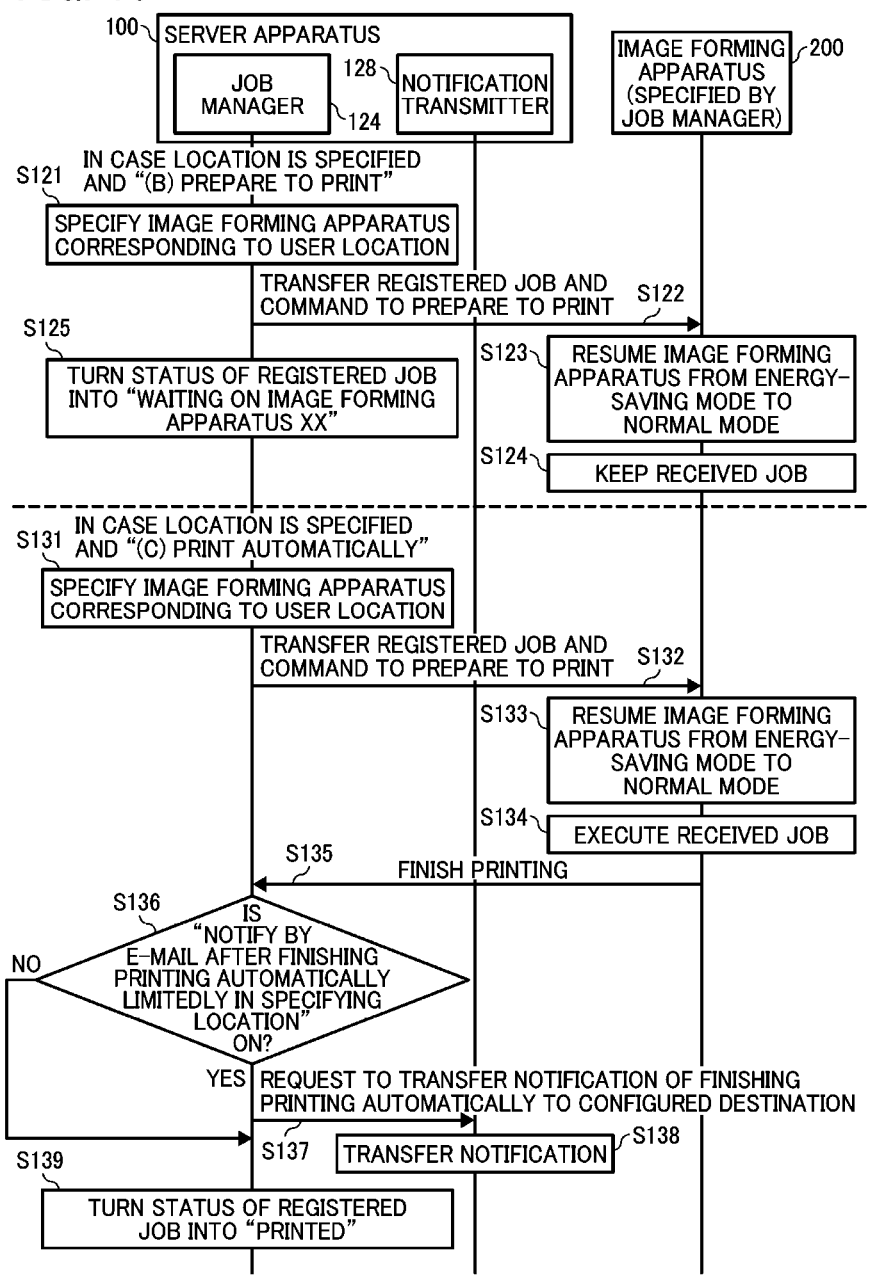
FIG. 15 is a diagram illustrating an operation executed by a job manager 124 in S111 in FIG. 14 as an embodiment of the present invention.
Figure 17:
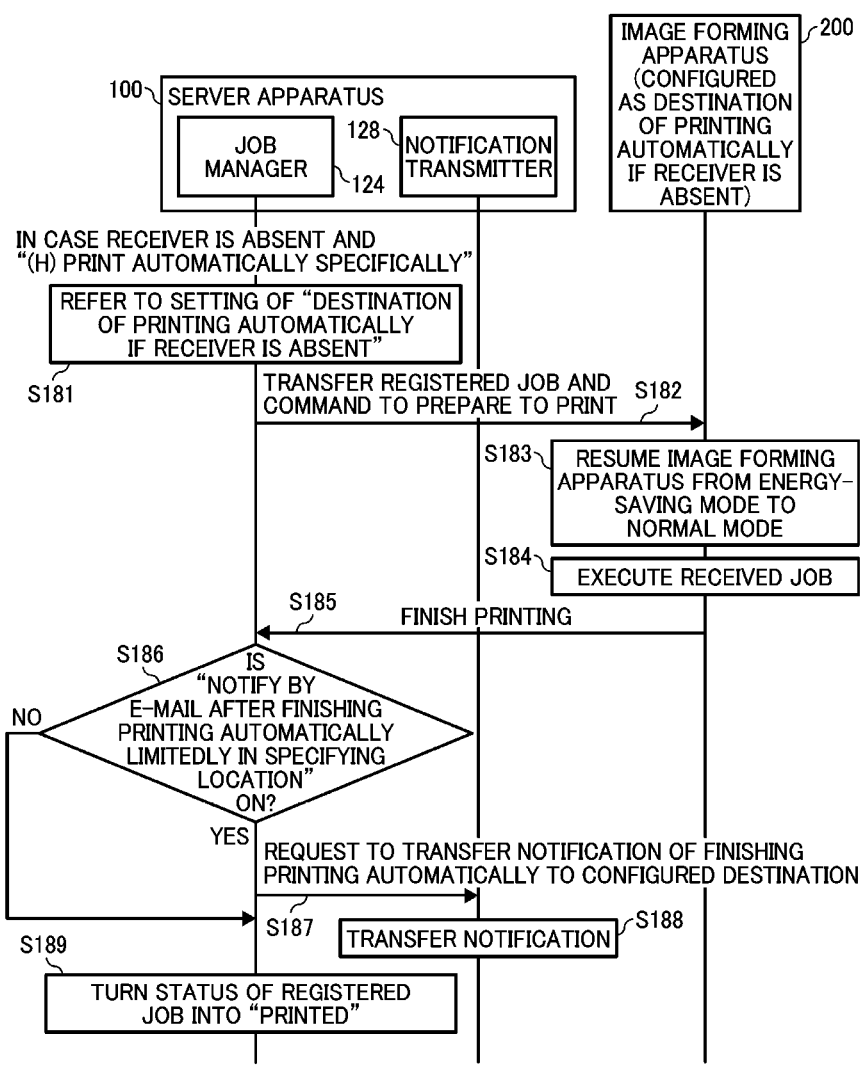
FIG. 17 is a diagram illustrating an operation executed by the job manager 124 in S111 in FIG. 14 as an embodiment of the present invention.

Next, FIGS. 15 and 17 are data sequence diagrams illustrating the operation performed by the job manager 124 in S111 in FIG. 14 for each combination of the user location and the automatic print settings.

First, in the upper part of FIG. 15, an operation when the user location is specified and "(B) prepare to print" is configured is illustrated.

In this case, the job manager 124 performs the operation illustrated in the upper part of FIG. 15. That is, the image forming apparatus 200 corresponding to the user location is specified using the information acquired in S109 in FIG. 14 in S121. Subsequently, the job registered in S108 in FIG. 14 (i.e., the job data and the bibliographic information of the job more specifically) and a command to prepare to print the job are transferred to the specified image forming apparatus 200 in S122. The transmission is performed via the job transmitter 126.

After receiving the transmission, in case of operating in the energy-saving mode, the image forming apparatus 200 recovers to the normal mode by the energy-saving controller 236 in S123. This is because it is supposed that the receiver user is located near the apparatus and it is possible to output the document in accordance with the command immediately. Therefore, the command to prepare to print as a trigger for the recovery also functions as the command to recover to the normal mode.

Next, the received job is stored in a predetermined storage device by the job manger 232 to hold the job in S124. As a result, if the user commands to execute the job, it is possible to execute the job immediately instead of taking time to acquire data from the server apparatus 100. It should be noted that the operation in S123 corresponds to the function of a transition unit and the operation in S124 corresponds to the function of a storing unit.

On the other hand, in the server apparatus 100, the job manager 124 changes the status of the registered job into "waiting in the image forming apparatus XXX". In this case, "the image forming apparatus XXX" indicates the identification information of the image forming apparatus specified in S121.

As described above, the server apparatus 100 can turn the image forming apparatus 200 corresponding to the location of the user as the receiver of the received document into the status that can output the document to be received by the user in accordance with the command from the user. In addition, since the document is not output until the user commands to output the document, it is possible to keep the system high-security. In this case, in case of operating the image forming apparatus 200, it is highly possible that the user operates the image forming apparatus 200 corresponding to the current user location. As a result, instead of transferring the job to other image forming apparatus 200, it is possible to achieve the effect to be able to output the document quickly adequately.

Next, in the lower part of FIG. 15, an operation when the user location is specified and "(C) print automatically" is configured is illustrated.

In this case, just like steps S121 and S122 in the upper part, job manager 124 specifies the image forming apparatus 200 corresponding to the user location in S131 and transfers the job to the specified image forming apparatus 200 in S132. It should be noted that the command to execute printing is transferred along with the job.

After receiving the job, just like the case in S123, the image forming apparatus 200 recovers to the normal mode in S133 and passes the job received by the job manager 132 to the job executor 235, and the job executor 235 execute the job in S134. Subsequently, it is reported to the job manger 124 in the server apparatus 100 (via the job transmitter 126) by the job manager 232 that the printing completed in S135. These operations correspond to the function of an executor. In addition, the command to execute printing as a trigger for the recovery in S133 also functions as the command to recover to the normal mode.

After receiving the notification in S135, the job manager 124 determines whether or not the setting of "notify by e-mail after finishing printing automatically limitedly in specifying location" is turned on for the target user in S136. If the setting is turned on, it is requested to the notification transmitter 128 to transfer a notification of finishing printing automatically to a preset destination in S137. In this case, information such as a destination address, identification information of the image forming apparatus 200 that executes printing, the location of the image forming apparatus 200, date/time of printing etc. is transferred as information required to be reported. After receiving the request in S136, in accordance with the request, the notification transmitter 128 transfers the notification of finishing printing (i.e., e-mail in this case) including the transferred information to the destination address in S138.

After S136, or if the setting is turned off (NO in S136), the job manager 124 changes the status of the registered job into "printed" indicating that the job has already been printed in S139. In this case, regarding the job whose statuses are turned to "printed" for all users who have authority to execute the job, it is possible to delete the registration of the job immediately. Otherwise, it is possible to delete the job registration after the user commands to delete the job. In other cases, it is possible to consider various operations such as deleting the job after a predetermined period of time elapses etc.

As described above, the server apparatus 100 can perform the automatic printing to have the image forming apparatus 200 corresponding to the location of the user as the receiver of the received document output the document automatically. As a result, if a user is located near the image forming apparatus 200, it is possible to have the image forming apparatus 200 output the document so that the user can obtain the document easily. In addition, it is reported to the user that the document is printed in accordance with the setting. Therefore, in case of turning the setting of the notification on, it is possible to prevent a case that the user does not notice that the document is printed and moves to another area, the user could not obtain the document at hand, and the document is left for a long period of time.

Figure 16:
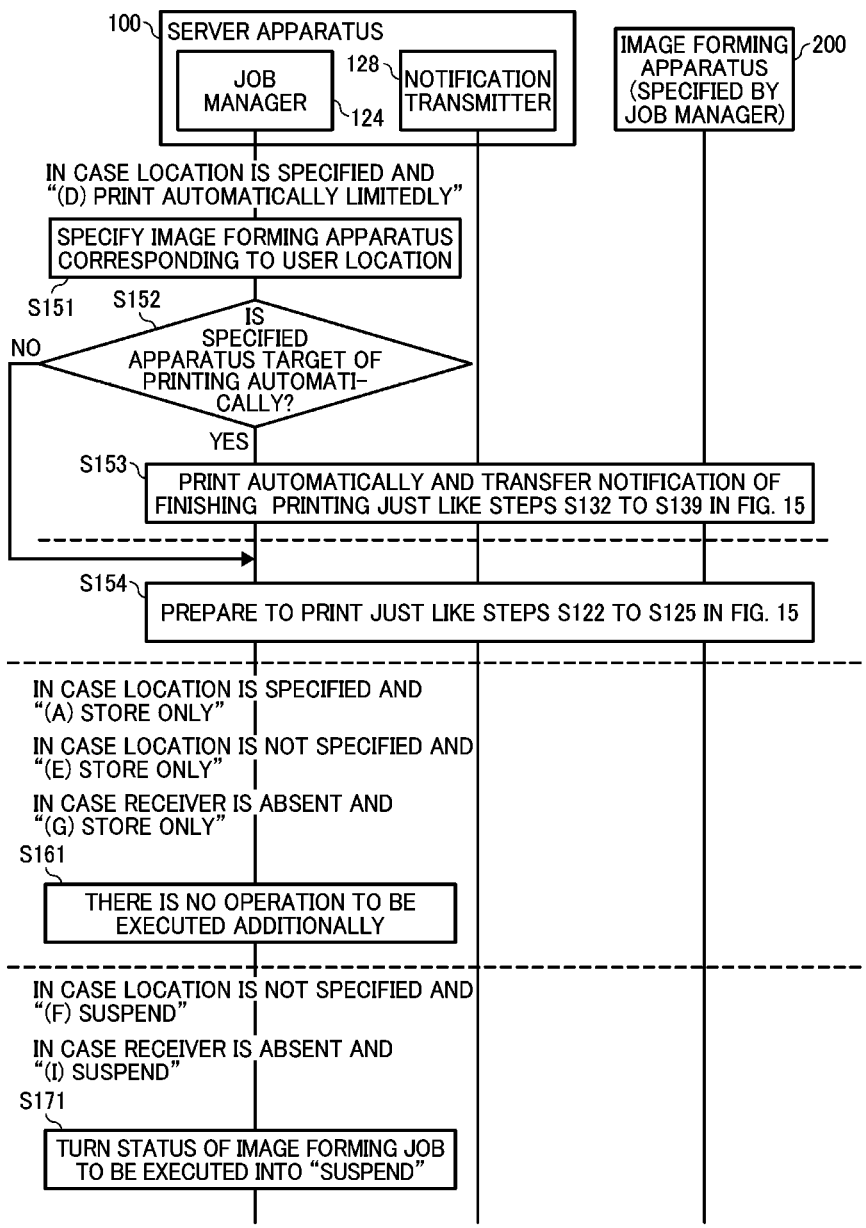
FIG. 16 is a diagram illustrating an operation executed by the job manager 124 in S111 in FIG. 14 as an embodiment of the present invention.

First, in the upper part of FIG. 16, an operation when the user location is specified and "(D) print automatically" is configured is illustrated.

In this case, just like the case in S121 in FIG. 15, the job manager 124 specifies the image forming apparatus 200 corresponding to the user location in S151. Subsequently, based on the setting of "destination of printing automatically limitedly in specifying location" for the target user, it is determined whether or not the image forming apparatus 200 specified in S151 is a target of the automatic print in S152. If the image forming apparatus 200 is the target of the automatic print, just like the case in S132 to S139 in FIG. 15, the job manager 124 performs the automatic print and transfers the completion report in S153. If the image forming apparatus 200 is not the target of the automatic print, just like the case in S122 to S124 in FIG. 15, the job manager 124 prepares to print in S154.

As described above, if it is specified that the user is located at the predetermined second area in the first area described above, the server apparatus 100 can have the image forming apparatus 200 corresponding to the location of the user as the receiver of the received document output the document automatically. If the user is not located at the second area, it is possible to maintain that the image forming apparatus 200 corresponding to the user location is in the status that can output the document to be obtained by the user quickly in accordance with the command from the user.

In some cases, even if the user is located near the image forming apparatus 200, it is possible that the user drops by the location incidentally. In that case, it is not preferable to print the document automatically unlimitedly. As a result, depending on the setting of "destination of printing automatically limitedly in specifying location", it is preferable to enable a configuration that has the nearby image forming apparatus 200 print automatically only when the user is located at a specific location such as an area where the user office is included etc.

It should be noted that it is possible to consider that the setting of "(C) print automatically" indicates the case setting a whole area where the corresponding image forming apparatus is located in the first area as the second area in the case of "(D) print automatically limitedly".

Next, in the middle part of FIG. 16, an operation when the user location is specified and "(A) store only" is configured is illustrated. It should be noted that operations performed if the user location is unknown and "(E) store only" is configured and if the user is absent and "(G) store only" is configured are the same as described below.

In these cases, there is no operation that the job manager 124 should perform in S111 in FIG. 14 in S161. That is, all required operations are finished by the registration in S108. If there is a request from the image forming apparatus 200 by an operation in FIG. 20 etc. subsequently, the registered job is transferred to the image forming apparatus 200 and executed by the image forming apparatus 200 in accordance with the request.

Next, in the lower part of FIG. 16, an operation when the user location is unknown and "(F) suspend" is configured is illustrated. It should be noted that an operation performed if the user is absent and "(I) suspend" is configured is the same as described below.

In these cases, the job manager 124 changes the status of the job registered in S108 in FIG. 14 into "suspended" in S171. The status "suspended" indicates that, if the user location is specified later, an operation in accordance with the setting of "operation when location is specified" should be performed for the target job.

As described above, by enabling to register the job in the server apparatus 100 in the suspended status, it is possible that the image forming apparatus 200 can prepare to print and print automatically after the user location is specified. As a result, when the user moves to the vicinity of any one of the image forming apparatus 200, just like the case that the user stay there since the job is registered, it is possible to obtain the document quickly.

If it is unnecessary to prepare to print automatically and print automatically, by configuring that as "operation when location is specified", it is possible to avoid preparing to print and print automatically even if the user location is specified. As a result, even in case of configuring "suspend", it is likely not the case that is against the user's interests compared to the case that "store only" is configured. Therefore, it is possible to set "suspend" as a default operation if the user location is unknown and the user is absent. Otherwise, it is possible to disable the configuration of "waiting" and integrate into "suspend".

Next, FIG. 17 is a diagram illustrating an operation when the user is absent and "(H) print automatically specifically" is configured.

In this case, regarding the target user, the job manager 124 refers to the configuration of "destination of printing automatically if receiver is absent" acquired in S110 in FIG. 14 in S181. Following operations in S182 to S189 are the same as the operation of printing automatically in S132 to S139 in FIG. 15 except that the destination of the job and the command to execute printing is the image forming apparatus 200 configured as "destination of printing automatically if receiver is absent" and a standard of determining whether or not it is possible to notify in S186 is the configuration of "notify by e-mail after finishing printing automatically if receiver is absent".

As described above, even if the user as the receiver of the received document is not located at the first area, the server apparatus 100 can have a predetermined specified image forming apparatus 200 output the document automatically. As a result, if the user is absent from the corporation for a long period of time, it is possible that a representative of the user's job browses the document. Even if there is no such representative, after coming to work, the user can acquire the document received while the user is absent by visiting a particular spot. By setting an apparatus located at an area where only reliable workers particularly can enter and leave as the specific image forming apparatus 200 described above, even in case printing automatically while the user is absent, it is possible to minimize security risk.

Figure 18:
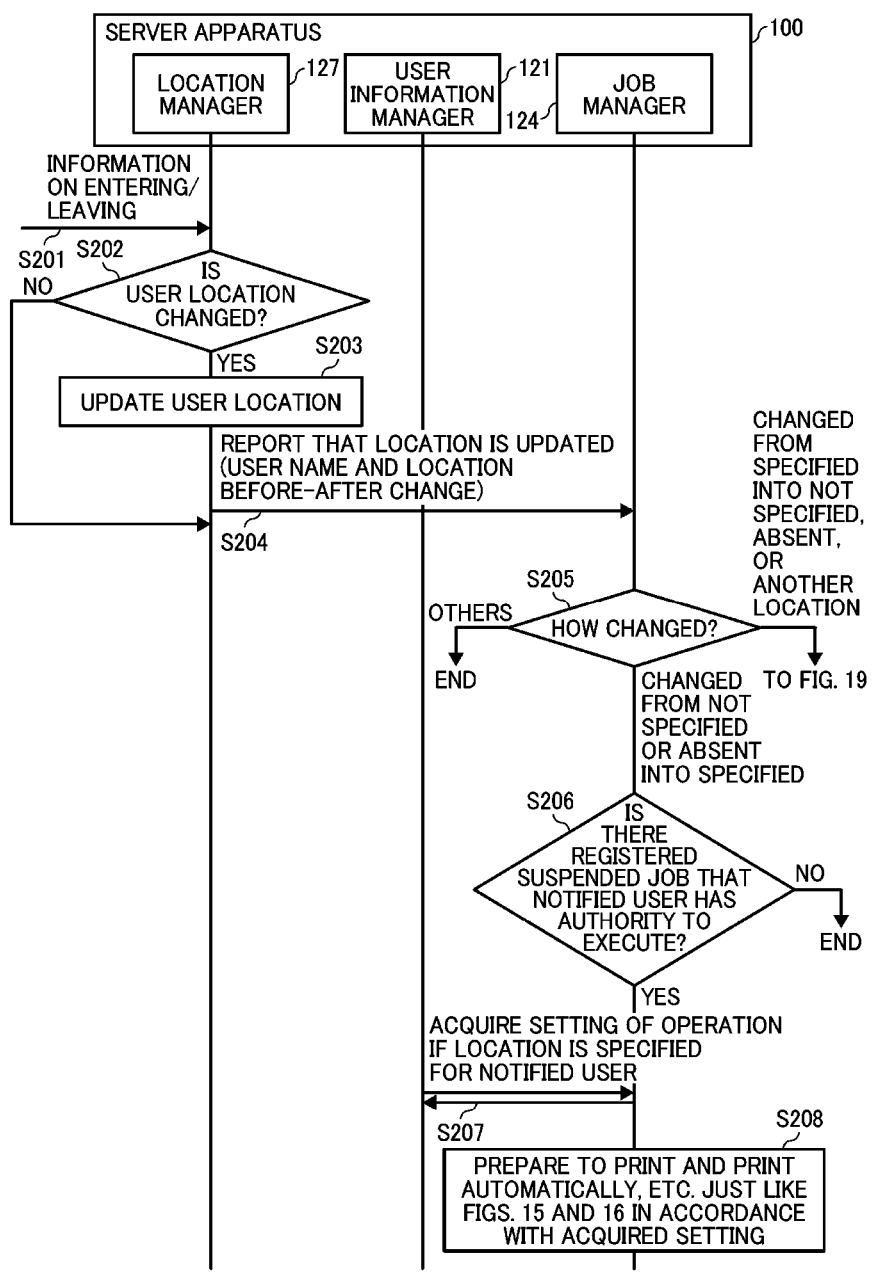
FIG. 18 is a sequence chart illustrating an operation executed by the server apparatus 100 and the image forming apparatus 200a if a location manager 127 receives entering/leaving information.
Figure 19:
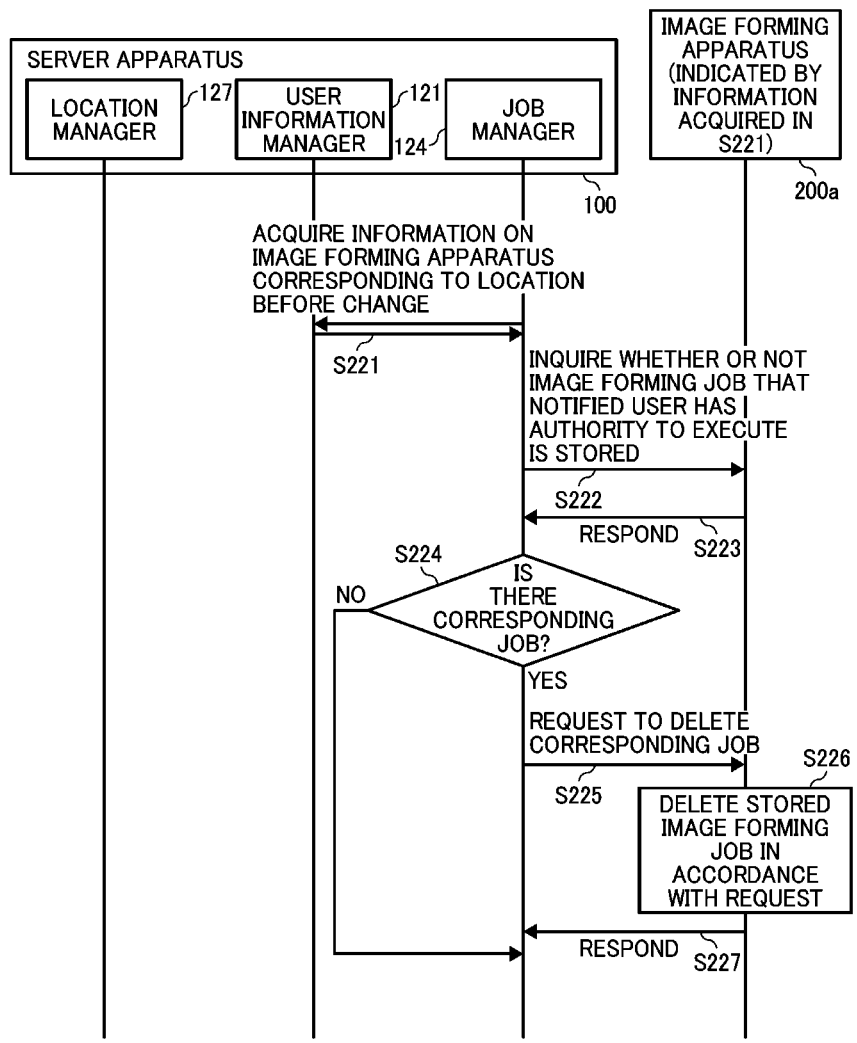
FIG. 19 is a sequence diagram illustrating an operation continued from FIG. 18.

Next, FIGS. 18 and 19 are diagrams illustrating operations performed by the server apparatus 100 and the image forming apparatus 200a if the location manager 127 in the server apparatus 100 receives entering/leaving information transferred by the entering/leaving information transmitter 423 in the entering/leaving information acquisition apparatus 400.

After receiving the entering/leaving information in S201, the location manager 127 in the server apparatus 100 determines whether or not the entering/leaving information indicates that the user location changes in S202. For example, the determination can be performed in accordance with the rules described before with reference to FIG. 12. If the determination is NO, the operation in accordance with receiving the entering/leaving information this time ends here. By contrast, if the determination is YES, the location manager 127 updates the user location in the user location table in FIG. 11 in accordance with the received entering/leaving information in S203 and reports the content of updating to the job manager 124 in S204. The notification includes a name of the user whose location is updated and information on locations before and after change due to the update. It is possible that the location is a specific area, "unknown", or "absent" according to circumstances.

On the other hand, after receiving the notification in S204, the job manager 124 performs an operation depending on the reported change. That is, if the location of the user that was unknown or absent is specified, operations after S206 are performed. If the specified location of the user turns to unknown or absent or changes into another area, operations in FIG. 19 are performed. In other cases, no particular operation is performed.

Regarding operations after S206, first, the job manager 124 determines whether or not a job whose status is suspended and that the user reported in S204 has authority to execute is registered in S206. In this case, if no job is registered, the operation in accordance with the notification in S204 ends. By contrast, if there is a registered job, the job manager acquires the setting of "operation when location is specified" registered in the automatic print configuration table for the reported user from the user information manager 121 in S207. In addition, settings of the destination of printing automatically and whether or not it is required to notify by e-mail are acquired along with the settings.

Next, regarding the job discovered in S206, in accordance with the settings acquired in S207, just like the case in FIG. 15 or 16, operations of preparing to print and printing automatically if the user location is specified are performed in S208. Along with that, operations of storing a job and executing a job etc. are performed on the side of the image forming apparatus 200a. In the operations described above, the job status is updated as needed. In case of finding multiple jobs in S206, the job manager 124 performs the operation in S208 for each of the multiple jobs.

As described above, in accordance with the fact that the user location is specified, operation just like the case if the user location is specified when the job was store is performed on the held job. As a result, it is easy for the user to acquire the document.

By contrast, regarding the operation in FIG. 19 if it is determined that the specified user location changes into unknown, absent, or another area in S205, first, the job manager 124 acquires information on the image forming apparatus corresponding to the user location before the change from the location manager 127 in S221. In the image forming apparatus, it is possible that a job that the user whose location changes this time has authority to execute is stored by the operations in FIG. 15 or 16 in the past. On the other hand, since the user has left from the area corresponding to the image forming apparatus, chances that the user executes the job on the image forming apparatus immediately are low. As a result, if the job is stored as is, that causes a waste of storage size, and it is undesirable from a viewpoint of security.

To cope with this issue, the job manager 124 inquires of the image forming apparatus 200a indicated by the information acquired in S221 whether or not a job that the user reported in S204 has authority to execute is stored in S222. In response to the inquiry, the job manager 232 in the image forming apparatus 200a as the destination of the inquiry replies whether or not the job is stored in S223.

If the job is stored (YES in S224), the job manager 124 requests the image forming apparatus 200a to delete the target job in S225. In response to the request, the job manager 232 in the image forming apparatus 200a deletes the stored job in S226 and returns the deletion result in S227. If the job is not stored (NO in S224), the operations in S225 to S227 are not performed.

Among the operations described above, the operation in S225 corresponds to a function of a deletion command unit, and the operation in S226 corresponds to a function of a deletion unit. As described above, it is possible to delete the job that chances of being executed by the user become low quickly from the image forming apparatus as the transmission destination. As a result, it is possible to utilize the storage area effectively.

After S227, or if the job is not stored (NO in S224), it is possible that the job manager 124 performs an operation in accordance with the setting of printing automatically depending on the location after change just like the case in S207 and S208 in FIG. 18.

Figure 20:
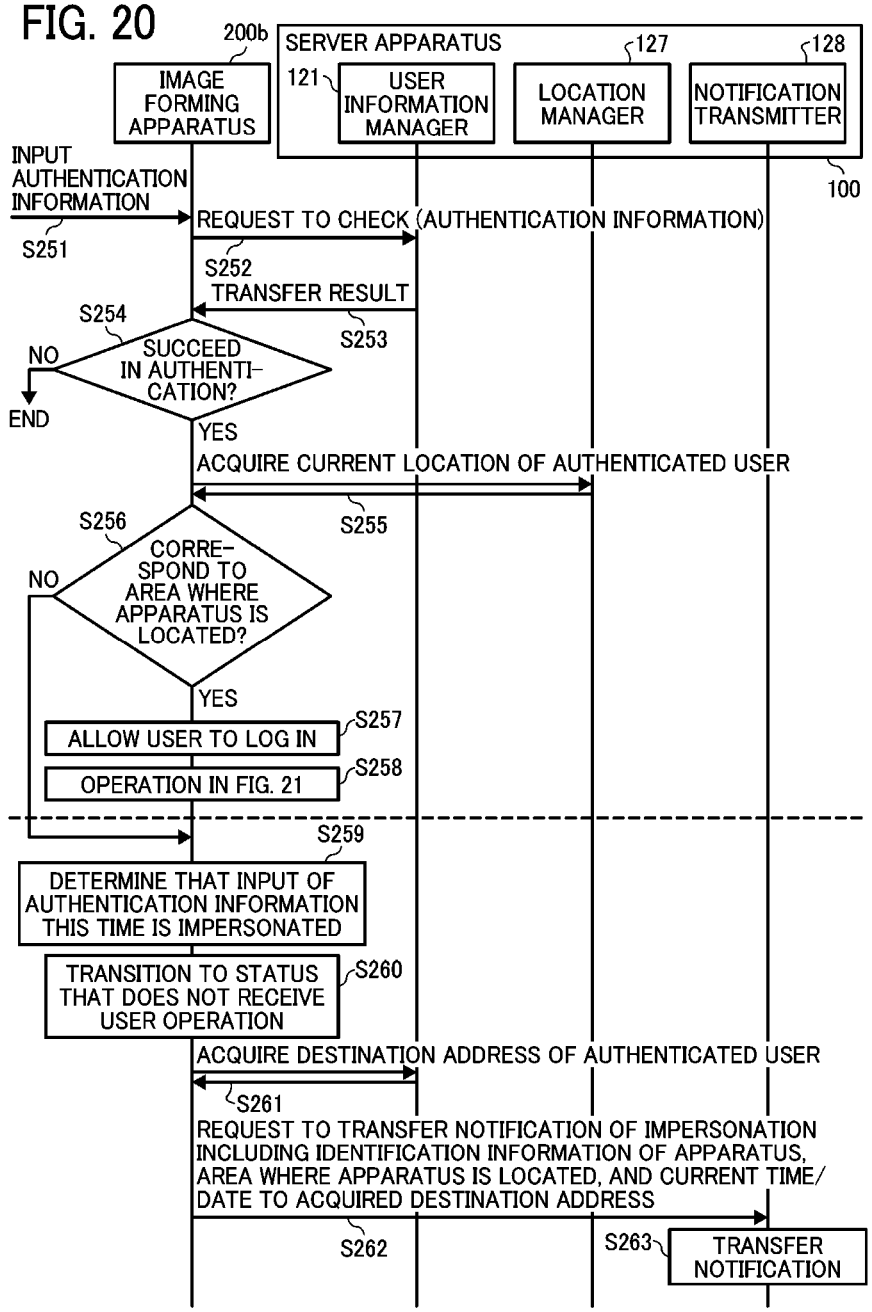
FIG. 20 is a sequence chart illustrating an operation executed by the image forming apparatus 200b and the server apparatus 100 if a user authentication unit 231 accepts an input of authentication information by user operation.

Next, FIG. 20 is a sequence chart illustrating an operation executed by the image forming apparatus 200b and the server apparatus 100 if the user authentication unit 231 in the image forming apparatus 200b accepts an input of authentication information by user operation. The image forming apparatus that accepts the input of the authentication information corresponds to a first image forming apparatus. The user authentication unit 231 in the image forming apparatus 200b performs the operation in FIG. 20 except S258.

If the user authentication unit 231 in the image forming apparatus 200b accepts the input of the authentication information by user operation in S251, the image forming apparatus 200b starts the operation in FIG. 20. First, the input authentication information is transferred to the user information manager 121 in the server apparatus 100 to request to check with the registered user information in S252. After receiving the request, the user information manager 121 checks the authentication in accordance with the request and returns to the image forming apparatus 200b whether or not there is a user corresponding to the authentication information and authority information indicating the user's authority if needed as the check result in S253.

After receiving the check result, the image forming apparatus 200b determines whether or not the authentication succeeds (i.e., there is a corresponding user) in S264. In case of failing authentication, the image forming apparatus 200b ends the operation in FIG. 20. By contrast, in case of succeeding authentication, the image forming apparatus 200b determines that it is possible that the user who inputs the authentication information is a user corresponding to the authentication information.

In this case, the image forming apparatus 200b requests the location manager 127 in the server apparatus 100 to transfer information on the current location of the user who succeeded authentication in S254 to acquire the information in S255. Subsequently, it is determined whether or not the acquired location corresponds to the area where the apparatus itself is located in S256. The information on the located area can be registered in the image forming apparatus 200b, or it is possible to acquire the information registered in the apparatus location table in FIG. 10 in S255.

Figure 21:
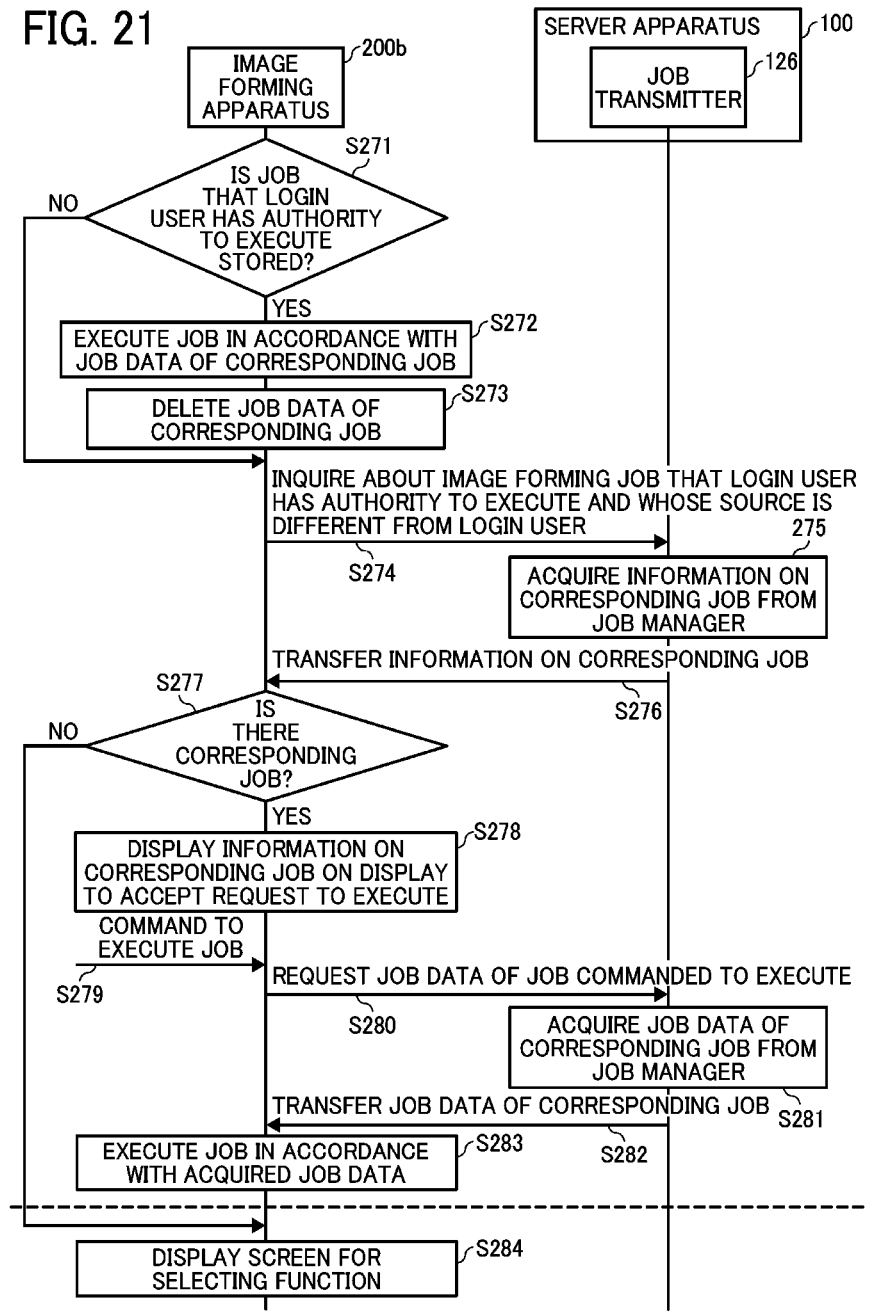
FIG. 21 is a sequence chart illustrating an operation executed by the image forming apparatus 200b in S258 in FIG. 20.

Anyhow, if the check matches in S256, the image forming apparatus 200b determines that the user who succeeded authentication in S254 is certainly the user and allows to log in as the user in S257. Subsequently, to provide the function of executing the job to the user who inputs the authentication information, the operation in FIG. 21 is performed in S258.

By contrast, if the check does not match in S256, the image forming apparatus 200b determines that the authentication information input in S251 this time was not input by the user who originally has the authentication information and another person inputs the authentication information by disguising as the user in S259. This is because it is not considered that the user can input the authentication information since the original user is not located around the image forming apparatus 200b.

Consequently, to prevent the disguising user from performing further inappropriate operations, the image forming apparatus 200b transitions itself to the status that does not accept user operations in S260. In this case, it is possible to display a message indicating that the authentication failed on the display 207.

In S261, the image forming apparatus 200b requests the user information manager 121 in the server apparatus 100 to transfer the destination address registered in the automatic print settings table in FIG. 8 for the user who succeeded authentication in S254 to acquire the destination information in S261. Subsequently, information such as its own identification information, its own location area, and current date/time etc. along with the acquired destination address are transferred to the notification transmitter 128 in the server apparatus 100 to request the notification transmitter 128 to transfer a notification indicating that there was an impersonation including the information to the destination address in S262. In accordance with the request, the notification transmitter 128 transfers the notification of impersonation (i.e., e-mail in this case) including the transferred information to the destination address in S263.

As described above, operations in S251 to S254 by the image forming apparatus 200b correspond to a function of an authentication unit. By performing operations in S254 and S255 by the image forming apparatus 200b, it is possible to discover the impersonation that is difficult to discover by checking the authentication information only effectively. In case of discovering the impersonation, by performing the operation after S260, it is possible to prevent the document of the registered job via the image forming apparatus 200b from being acquired inappropriately. In addition, it is possible to report to the user that there was impersonation quickly.

In this case, it is not always necessary to consider that locations match as a standard in the determination in S256. For example, in case of specifying the location precisely using coordinates etc., it is possible that the user can operate the image forming apparatus 200b even if the locations are slightly different. In addition, in case of managing the location of the image forming apparatus 200b and the user location using different resolutions, if the user is located somewhere in finer area within the area where the image forming apparatus 200b is located, it is possible to consider that the user can operate the image forming apparatus 200b.

As a result, by considering these circumstances, if the location of the image forming apparatus 200b is apart from the user location that it is difficult to consider that the user can operate the image forming apparatus 200b, the image forming apparatus 200b can determine that the location information do not "match", and the operation in case of NO in S256 can be performed.

Next, the operation in FIG. 21 performed by the image forming apparatus 200b in S258 in FIG. 20 is described below.

In FIG. 21, first, the job manager 232 in the image forming apparatus 200b determines whether or not a job that the login user (who was allowed to log in in S257 in FIG. 20) has authority to execute is stored in S271. If there is a corresponding job, in accordance with the job data of the job, the job executor 235 executes the target job in S272. Subsequently, the job data of the target job is deleted in S273.

As described above, it is possible to automatically execute the job stored in the image forming apparatus 200 located near the receiver user in S124 in FIG. 15 etc. preliminarily in response to login of the target user, and it is possible to deliver the document transferred to the target user to the target user without particular operation by the target user.

Next, the job manager 232 in the image forming apparatus 200b inquires of the job transmitter 126 in the server apparatus 100 whether or not a job that the login user has authority to execute whose source is different from the login user is registered in S274. If the target job is registered, a request to transfer information on the job is also included in the inquiry.

After receiving the inquiry, the job transmitter 126 acquires the information on the job that matches the condition from the job manager 124 in S275 and replies to the image forming apparatus 200b in S276. If there is no corresponding job, a message indicating that fact is returned. In this case, it is considered that the image forming apparatus 200b has already executed the job that has already been held by the image forming apparatus 200b as the inquiry source. Therefore, it is possible to exclude the source image forming apparatus 200b from the replying list.

After receiving the reply, the image forming apparatus 200b determines whether or not there is a job that corresponds to the condition in S277. If there is such a job, the job presenting unit 233 displays a job list screen 510 in FIG. 22 on the display 207 to present those jobs to the user, and the operation acceptance unit 234 accepts a command to execute a job by user operation in S278.

After detecting the command to execute from the login user in S279, in the image forming apparatus 200b, the job manager 232 requests the job transmitter 126 in the server apparatus 100 to transfer job data required to execute the job commanded to executed in S280. In this case, it is possible to request to transfer job data for multiple jobs.

After receiving the request, the job transmitter 126 acquires the job data for the requested job from the job manager 124 in S281 and returns the job data to the image forming apparatus 200b in S282.

After receiving the reply, in the image forming apparatus 200b, the job executor 235 executes the job based on the received job data in S283.

It should be noted that the server apparatus 100 can delete the data for the finished job automatically. Otherwise, after holding the data as is, it is possible to delete the data in accordance with user instruction.

As described above, if the job that the login user has authority to execute whose source is different from the login user is registered in the server apparatus 100, the image forming apparatus 200b can present the job to the user preferentially compared to other jobs. In addition, the image forming apparatus 200b can execute the job.

After finishing operations related to the job, in the image forming apparatus 200b, the operation acceptance unit 234 displays a function selection screen 520 (with reference to FIG. 22) on the display 207 in S284.

In case of NO in S277 or if a command not to execute the presented job in S278, following operations are skipped and the step proceeds to S284.

Figure 22:
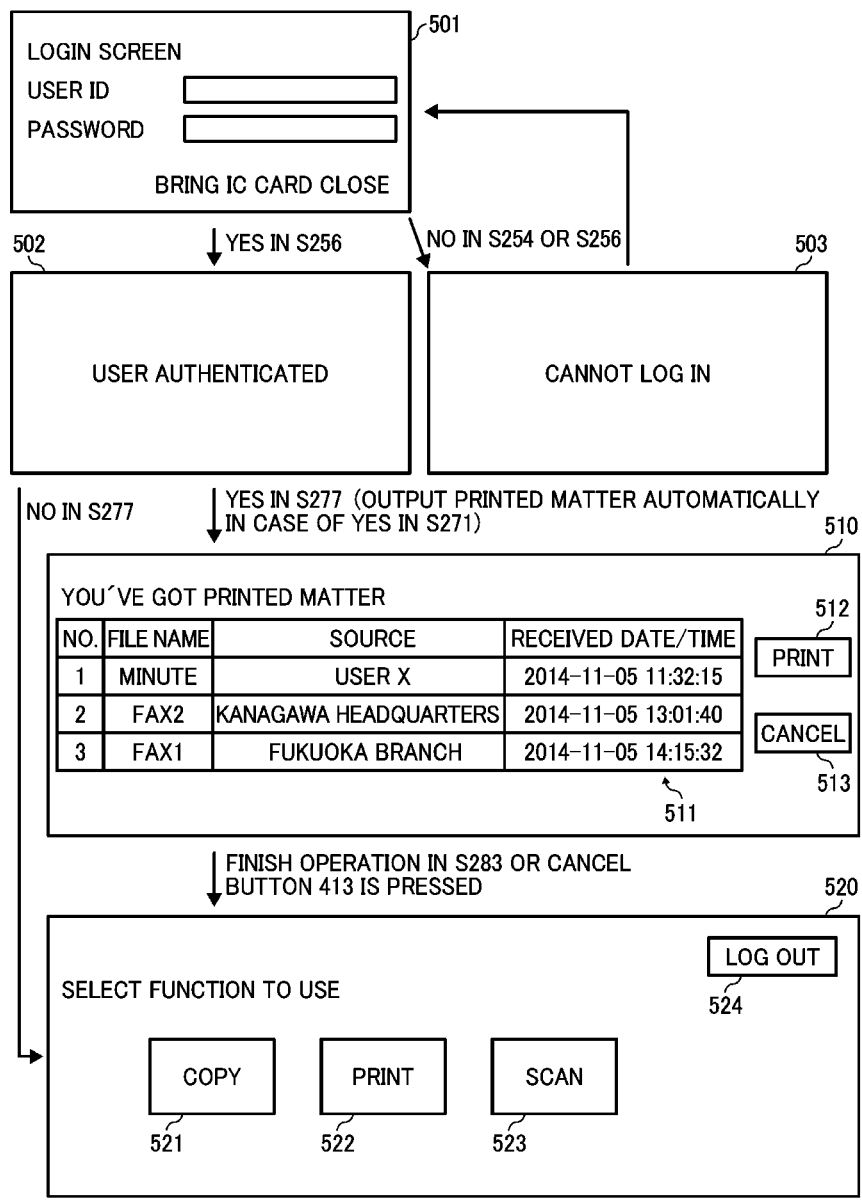
FIG. 22 is a diagram illustrating transition of a screen displayed by the image forming apparatus 200b in the operations of FIG. 20 and FIG. 21.

FIG. 22 is a diagram illustrating transition of a screen displayed by the image forming apparatus 200b in the operations of FIG. 20 and FIG. 21 described above.

First, a screen for accepting the input of the authentication information in S251 in FIG. 20 corresponds to an authentication information input screen 501 on the upper left in FIG. 22. This screen is a basic screen displayed when no user is logging in. In case of inputting the authentication information using the authentication information reading apparatus 211, it is possible to input the authentication information even in the case that the screen is not displayed.

Next, a screen for indicating that the authentication failed 503 is displayed, after the user inputs the authentication information, if the image forming apparatus 200b determines that the authentication failed (NO in S254) or the located areas do not correspond (NO in S256). This screen is a screen for reporting to the user that the authentication failed. If the authentication failed in S254, after a predetermined period of time elapses, the image forming apparatus 200b returns to the authentication information input screen 501 to accept inputting the authentication information. However, if the located areas do not correspond in S256, it is considered that is not just failing to input the authentication information but it is suspected that there is the impersonation. Therefore, it is preferable to keep the status that does not accept user operation until the administrator or a service staff member of the manufacturer unlocks the apparatus.

By contrast, if the image forming apparatus 200b determines that the located areas correspond (YES in S256), an authentication success screen 502 is displayed. This screen is a screen for reporting to the user that the authentication succeeded, and the image forming apparatus 200b performs operations in S271 to S277 in FIG. 21 displaying this screen. It should be noted that, in case of YES in S271, the printed matter for the target job is printed out automatically.

If there is the target job (YES in S277), the image forming apparatus 200b displays the job list screen 510 in S278. This screen is described before with reference to FIG. 13. If the print button 512 is pressed, the image forming apparatus 200b determines that the command to execute the job selected at that point is accepted. Subsequently, the job is executed by performing the operations in S280 to S283. After that, it is possible to keep displaying the job list screen 510 to accept the command to execute a job again or proceed to the function selection screen 520 automatically.

If the cancel button 513 is pressed, the image forming apparatus 200b determines that a command to close the job list screen 510 and proceed to the function selection screen 520 is accepted and displays the function selection screen 520 in S284. If there is no target job (NO in S277), the same operations are performed.

The function selection screen 520 is a normal top screen displayed firstly in case of NO in S277, i.e., if there is no particular information to be reported to the user in logging in. On the function selection screen 520, the image forming apparatus 200b accepts selecting a function to be used by the login user. In FIG. 22, a copy function, a print function, and a scan function are provided as selectable functions, and buttons 521 to 523 corresponding to each function are laid out. A button 524 is a button to command to log out.

Among the functions described above, the print function is a function to execute a job stored in the server apparatus 100. After selecting the print function using the button 522 by user operation, just like the operations in S274 to S276, the image forming apparatus 200b acquires information on a job that the login user has authority to execute (regardless of source in this case) from the server apparatus 100. In addition, just like the operations in S278 to S283, the image forming apparatus 200b executes the job selected by user operation.

As described above, in the first embodiment, in registering the job to be executed by the image forming apparatus, the server apparatus 100 can perform the appropriate operation regarding the job depending on whether or not the user who has authority to execute the job is located within the specific first area. For example, if the user location is in the first area, the job to be registered is transferred to the image forming apparatus corresponding to the user location to store the job. By contrast, if the user location is not in the first area, it is possible not to perform the transmission.

That is, if the user is located in the area where the server apparatus 100 can manage, it is possible to receive the document regarding the job that an image is formed on paper quickly without taking time to transfer data etc. By contrast, if the user is not located in that area, in order to save the storage area and ensure security, it is possible to transfer the job after accepting access by user operation. As a result, by using the server apparatus 100, after the document is transferred by using electronic communication, it is possible to establish an environment that the receiver can receive the document that an image is formed on paper safely and readily.

Effects of the operations performed by the server apparatus 100 corresponding to the automatic print settings (A) to (I) are described before with reference to FIGS. 15 to 17.

In addition, by using the job list screen 510, the image forming apparatus 200b can present the job that the login user has authority to execute whose source is different from the login user to the user preferentially compared to other jobs.

As a result, even if the document is transferred by facsimile communication or document distribution that is difficult to know by the receiver when to receive, it is possible to let the user know there is the transferred document when the user who is supposed to receive the document tries to use the image forming apparatus 200b. In addition, it is possible to form and output an image in accordance with user instruction. The output is performed when the user is in front of the apparatus, it is possible to prevent a third party from taking away the output paper. Furthermore, it is unnecessary to configure a special setting such as personal printing etc., easing the burden for users.

In the first embodiment, in FIG. 20, it is possible to omit to check the location information in S255 and S256. In this case, if the authentication succeeded, the user is allowed to log in immediately.

In addition, in the first embodiment, the job is registered for the document received by facsimile and distributed by document distribution. However, it is possible to perform the same operations for documents transferred or supplied by using other methods. It is unnecessary that any one of the image forming apparatus 200 is involved in registering a job in the server apparatus 100. It is possible to adopt the embodiment if the server apparatus 100 itself registers a job regarding a document reported to a user etc. automatically.

In addition, in FIGS. 6 and 7, regarding the document received by facsimile, based on the information on the relationship between the job source and the user who has authority to execute, the user who has authority to execute the acquired job (i.e., destination of the document) is determined. The method described above is useful since it is possible to specify the source of the document using the simple operation in the environment that a specified user is involved with a document from a specified client.

However, the method of specifying the document source is not limited to the method described above. For example, by performing an optical character recognition (OCR) process on the first page of the document, it is possible to specify the document source based on the result of character recognition for the part where the address is written. In that case, it is possible to extract a string laid out next to a prefix such as "Mr." and "Dr." etc. from several lines above a preregistered corporation name and check whether or not the extracted string corresponds to a preregistered user name.

Next, a second embodiment of the present invention is described below.

In this embodiment, five points described below are different from the first embodiment. First, jobs that the authenticated user has authority to execute are present to the user as a whole regardless of their sources. Second, the stored job is not executed automatically in accordance with user login but executed in accordance with user instruction to execute the job. Third, it is possible to configure settings of deleting an executed job. Fourth, it is possible to modify a receiver of a document registered as a job. Fifth, it is possible to preview a job registered in the server apparatus 100.

However, the fundamental configuration of this embodiment is the same as the first embodiment. Therefore, those only different points described above are described. In addition, same symbols are used for configurations common to or corresponding to the first embodiment.

Figure 23B:
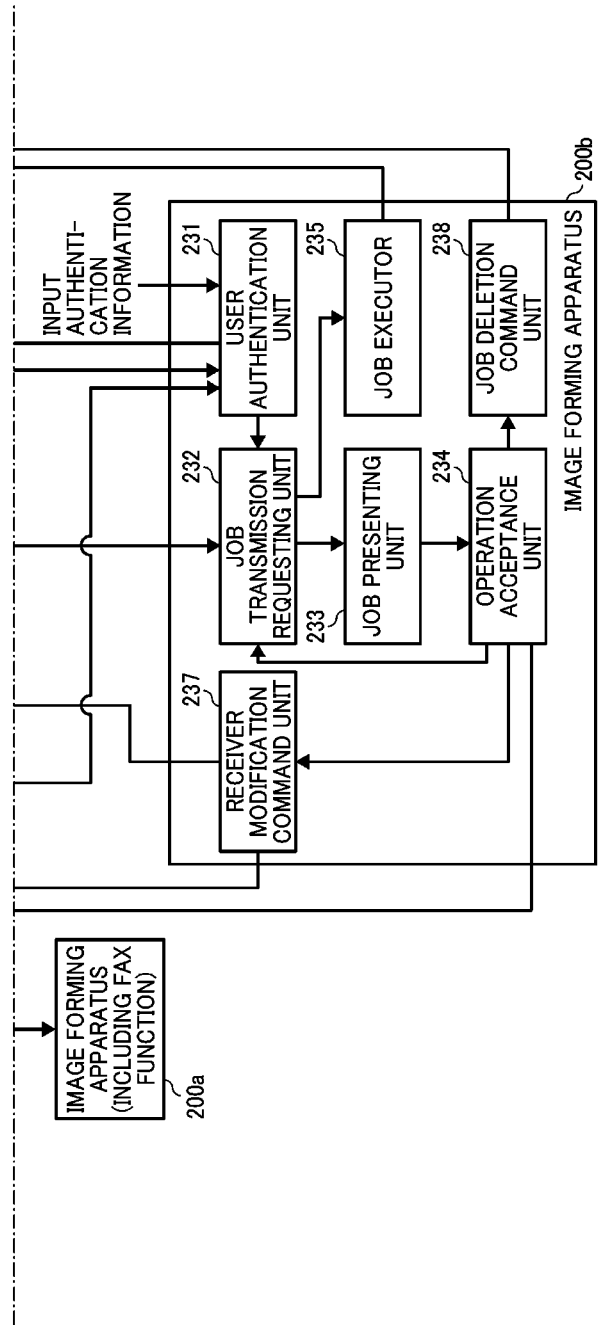

FIGS. 23A and 23B are diagrams illustrating a functional configuration of an image forming system in this embodiment.

In the image forming system 1 in FIGS. 23A and 23B, in addition to the image forming system in the first embodiment in FIG. 6, the server apparatus 100 further includes a job editor 129 and a deletion setting unit 130, and the image forming apparatus 200b further includes a receiver modification command unit 237 and a job deletion command unit 238. Functions of the image forming apparatus 200a are the same as the functions illustrated in FIG. 6. (However, the image forming apparatus 200a can include the receiver modification command unit 237 and the job deletion command unit 238.) Therefore, the distribution acceptance unit 125 that processes requests from the image forming apparatuses 200a and 200b is simplified illustrated. Among functions illustrated in FIGS. 23A and 23B, points different from the functions described before with reference to FIG. 6 are described below. Unmentioned points are similar to the functions described before with reference to FIG. 6.

First, in FIGS. 23A and 23B, in addition to the functions described in FIG. 6, the job manager 124 deletes (or does not delete) the registration of the executed job from the job registration table in FIG. 9 in accordance with deleting settings by the deletion setting unit 130 after receiving a notification from the job executor 235 in the image forming apparatus 200b that the job executor 235 finishes executing the job. Regarding the executed job, if multiple users that have authority to execute are registered, first, the job manager 124 deletes the authority to execute of the user who executes the job this time. As a result, after that, it is possible to prevent from presenting the same job to the user who executed the job. After the deletion, if there is no user who has authority to execute, that indicates the user who needs to execute the job does not exist anymore, and the job manager 124 deletes the registration of the job itself.

In accordance with a request from the receiver modification command unit 237 in the image forming apparatus 200b, the job editor 129 modifies a user who has authority to execute a job registered by the job manager 124. It is possible that the job editor 129 accepts only requests in accordance with operations by user who currently has authority to execute the modified job.

The deletion setting unit 130 configures whether or not the job manager 124 deletes a job itself or user authority to execute when it is finished to execute the job and turns the deletion by the job manager 124 enabled or disabled. The settings can be configured by accessing the server 100 from the terminal apparatus 300 by an administrator.

In addition to the whole job data described in the first embodiment and the information on the job, the job transmitter 126 can transfer a preview image of the job in accordance with a request from the job manager 232. The preview image is a thumbnail of an image formed on paper in case of executing the job and can be generated in accordance with the job data registered by the job manager 124.

On the other hand, in the image forming apparatus 200b, unlike the case in FIG. 6, in case of commanding the job transmitter 126 in the server apparatus 100 to transfer the information on the registered job, the job manager 232 performs the request regardless whether or not the source of the job is different from the user authenticated by the user authentication unit 231. Subsequently, the job manager 232 passes the bibliographic information of the job transferred in accordance with the request to the job presenting unit 233 to present that the job exists. In this case, jobs whose source is different from the authenticated user are displayed preferentially compared to other jobs. For example, those jobs are displayed on the upper part browsed by the user first, or those jobs are display noticeably by marking or emphasizing.

In order to determine which job is to be displayed preferentially, the job manager 232 also requests the job transmitter 126 to transfer the information on the source of each job to acquire the information.

In addition, regarding the job that has already been transferred by the server apparatus 100 and is stored in the job manager 232, the job manager 232 passes the bibliographic information to the job presenting unit 233 to present the existence of the job to the user. Since the stored job is immediately executable, it is preferable to display that job further preferentially compared to a job whose source is different from the authenticated user. Unlike the case in the first embodiment, in case of storing a job that the login user has authority to execute, the job manager 232 does not execute the job automatically without waiting for the user instruction.

In addition, the operation acceptance unit 234 accepts user operations on the screen displayed by the job presenting unit 233. In FIGS. 23A and 23B, in addition to instructions for executing a job and transition a screen, the operation acceptance unit 234 accepts instructions for displaying a preview image, modifying a receiver, and deleting a job. Subsequently, the instruction for displaying the preview image is passed to the job manager 232, the instruction for modifying the receiver is passed to the receiver modification command unit 237, and the instruction for deleting the job is passed to the job deletion command unit 238.

In accordance with the instruction for displaying the preview image described above, the job manager 232 also requests the job transmitter 126 in the server apparatus 100 to transfer a preview image of the instructed job and acquires the preview image to pass the preview image to the job presenting unit 233.

In addition, the job presenting unit 233 displays the preview image on the display 207 to present the preview image to the user.

In addition to the job executing function described before with reference to FIG. 6, when it is finished to execute a job, the job executor 235 reports to the job manager 124 in the server apparatus 100 as the source of the job data that it is finished to execute the job.

In addition, in receiving the instruction for modifying a receiver from the operation acceptance unit 234, the receiver modification command unit 234 requests the job editor 129 in the server apparatus 100 to modify authority to execute the job in accordance with the instruction. In performing the request, it is possible to acquire information on candidates for a user after the modification from the user information manager 121 in the server 100.

In addition, in receiving the instruction for deleting a job from the operation acceptance unit 234, the job deletion command unit 238 requests the job editor 129 in the server apparatus 100 to delete the job in accordance with the instruction.

Next, how operations performed by each apparatus that functions as described above are implemented is described below.

First, the operation when the FAX receiver 221 in the image forming apparatus 200a receives a document is the same as the operation illustrated in FIGS. 14 to 17. In addition, the operation when the location manager 127 in the server apparatus 100 receives the entering/leaving information transferred by the entering/leaving information transmitter 423 in the entering/leaving information acquisition apparatus 400 is the same as the operation illustrated in FIGS. 18 and 19.

Regarding the operation when the user authentication unit 231 accepts inputting the authentication information by user operation, the part illustrated in FIG. 20 is also common in this embodiment. However, the operation when the user is allowed to log in, the operation in FIG. 24 is used instead of the operation in FIG. 21.

Figure 24:
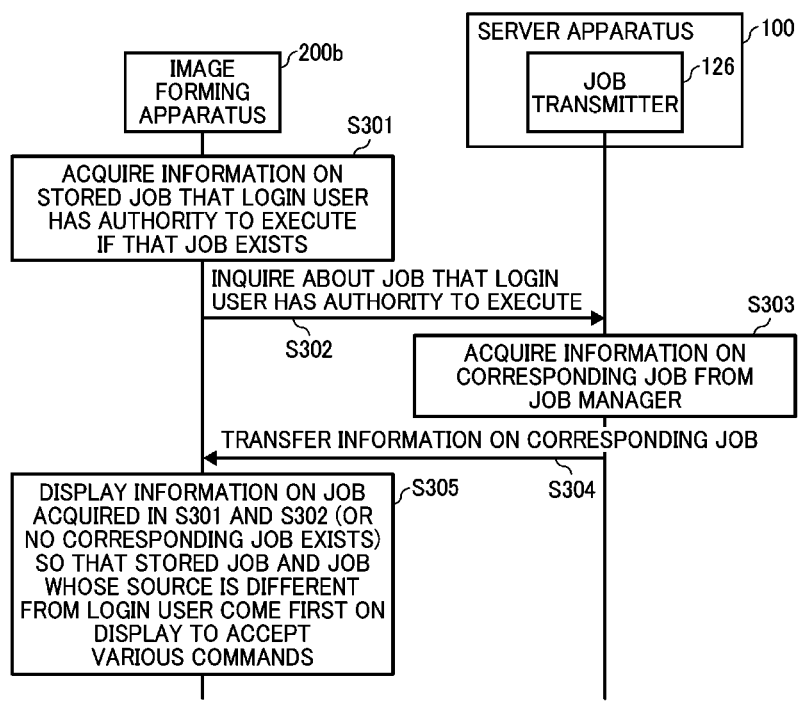
FIG. 24 is a sequence chart illustrating an operation corresponding to FIG. 21 if the user authentication unit 231 accepts an input of authentication information by user operation as an embodiment of the present invention.

In FIG. 24, first, if the job manager 232 in the image forming apparatus 200b stores a job that the login user (who was allowed to log in in S257 in FIG. 20) has authority to execute, the image forming apparatus 200b acquires the information on the job in S301.

Next, the job manager 232 in the image forming apparatus 200b inquires of the job transmitter 126 in the server apparatus 100 whether or not a job that the login user has authority to execute is registered in S302. If the target job is registered, a request to transfer information on the job is also included in the inquiry.

After receiving the inquiry, the job transmitter 126 acquires the information on the job that matches the condition from the job manager 124 in S303 and returns the information to the image forming apparatus 200b in S304. If there is no corresponding job, a message indicating that fact is returned. In this case, it is unnecessary to transfer the information on the job that has already been held by the image forming apparatus 200b as the inquiry source. Therefore, it is possible to exclude the source image forming apparatus 200b from the replying list. Otherwise, it is possible that the image forming apparatus 200b excludes the redundant.

After receiving the reply, the image forming apparatus 200b presents the information on the job acquired in S301 and S304 (or a notification that there is no corresponding job) to the user using the job presenting unit 233 in S305.

FIG. 25 is a job list screen used for the presentation.

The job list screen 510' in FIG. 25 is a screen displayed on the display 207. Just like the job list screen 510 in FIG. 13, information on each job acquired in S301 and S304 in FIG. 24 is displayed in the list display part 511.

However, in addition to the items in FIG. 13, "distributed" is included in the list display part 511 to display whether or not the target job is distributed from a user other than the user currently logging in the image forming apparatus 200b such as a received document by facsimile communication etc. "Yes" in "distributed" indicates that the job is regarding distribution. In addition, jobs regarding distribution is preferentially displayed an area upper than other jobs that is browsed first by the user.

Regarding jobs other than the distributed job, the source is the login user himself/herself. Therefore, "-" is displayed in "source" item to indicate that fact.

In addition, if there is a distributed job, the job presenting unit 233 displays a message 517 indicating that fact on the upper part of the job list screen 510' to present that fact to the user.

Furthermore, item "waiting" is also included in the list display part 511 to display whether or not the target job has already been stored in the image forming apparatus 200b and is executable without acquiring the job data from the server apparatus 100 newly. "Yes" in "waiting" indicates that the job has already been stored. In addition, jobs that have already been stored is preferentially displayed an area upper than other jobs that is browsed first by the user.

On the job list screen 510', regardless of values in "distributed" and "waiting", by touching a line corresponding to each job in the list display part 511 by user operation, it is possible to toggle the status of the job on that line between selected and unselected.

In addition to the print button 512 and the cancel button 513 just like in FIG. 13, the job list screen 510' further includes a preview button 514, a transfer button 515, and a delete button 516.

Among them, the preview button 514 is a button for accepting an instruction for displaying a preview image indicating abstract of a printing result regarding a job selected in the list display part 511.

The transfer button 515 is a button for accepting an instruction for modifying a receiver of a document regarding a job selected in the list display part 511.

The deletion button 516 is a button for accepting an instruction for deleting a document regarding a job selected in the list display part 511.

Next, with reference to FIGS. 26 and 32, operations of the image forming apparatus 200b and the server apparatus 100 in case of detecting an instruction from buttons in the job list screen 510' are described below.

Figure 26:
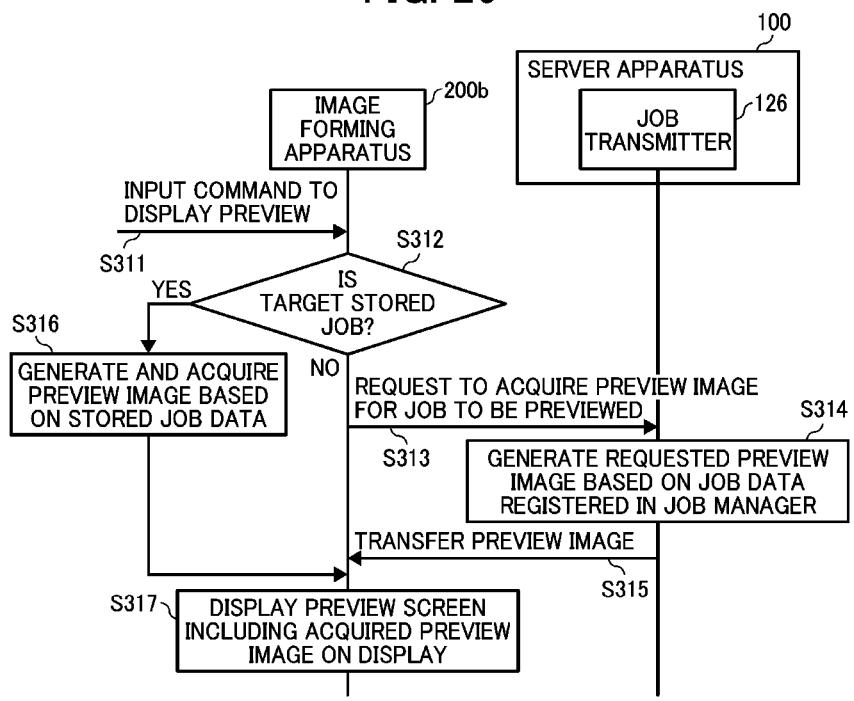
FIG. 26 is a sequence chart illustrating an operation executed by the image forming apparatus 200b and the server apparatus 100 if the image forming apparatus 200b detects a command to display a preview.

First, FIG. 26 illustrates an operation if the image forming apparatus 200b detects the instruction for displaying a preview by using the preview button 514. The instruction for displaying a preview is performed after specifying a job whose preview is to be referred to.

After detecting the instruction for displaying a preview from the login user in S311, in the image forming apparatus 200b, the job manager 232 determines whether or not the job whose preview is to be browsed has already been stored in the image forming apparatus 200b in S312.

In case of NO in S312, in the image forming apparatus 200b, the job manager 232 requests the job transmitter 126 in the server apparatus 100 to acquire a preview image of the job whose preview image is to be browsed in S313.

After receiving the request, based on the job data registered in the job manager 124, the job transmitter 126 generates data of the requested preview image in S314 and returns the generated preview image to the image forming apparatus 200b in S315.

By contrast, in case of YES in S312, in the image forming apparatus 200b, the job manager 232 generates data of the preview image based on the stored job data regarding the job whose preview image is to be browsed to acquire the generated data in S316.

Next, in the image forming apparatus 200b, the job manager 232 and the job presenting unit 233 displays a pop-up preview image on the display 207 based on the data acquired in S315 and S316 in S317.

Figure 27:
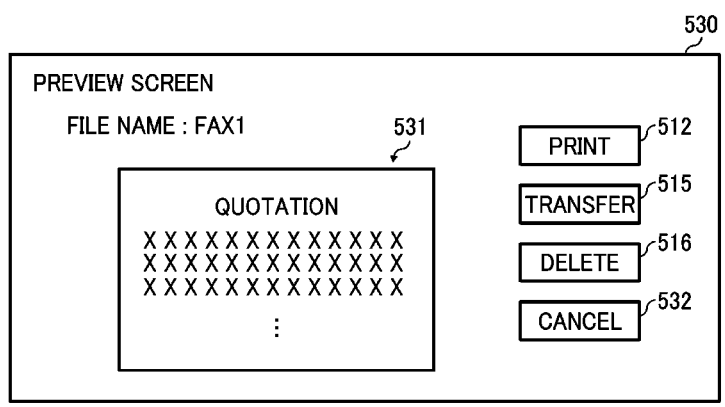
FIG. 27 is a diagram illustrating a preview screen as an embodiment of the present invention.

FIG. 27 is a diagram illustrating a preview screen displayed in S317.

The preview screen 530 includes a preview image display part 531, a print button 512, a transfer button 515, a deletion button 516, and a cancel button 532.

Among the components described above, the preview image display part 531 is an area for displaying a preview image.

The print button 512, the transfer button 515, and the deletion button 516 have similar functions as corresponding buttons in the job list screen 510. In this case, instructions for each button are accepted assuming that the job whose preview is being displayed is selected.

The cancel button is a button for accepting an instruction for closing the preview screen and going back to the job list screen 510'.

With reference to the preview image displayed on the preview screen 530, it is possible to determine whether or not the target job is to be executed. Especially, in the case of a job regarding a document received by the image forming apparatus 200a by facsimile communication and distributed to the user, it is possible that the receiver is estimated wrongly and the document should originally be received by a user other than the user who is browsing the preview image. If it is noticed that the document should be received by another user by user operation with reference to the preview image, by pressing the transfer button 515 and requesting to modify the receiver for the target job, it is possible to configure that the document is distributed to the user who originally should receive the document.

Figure 28:
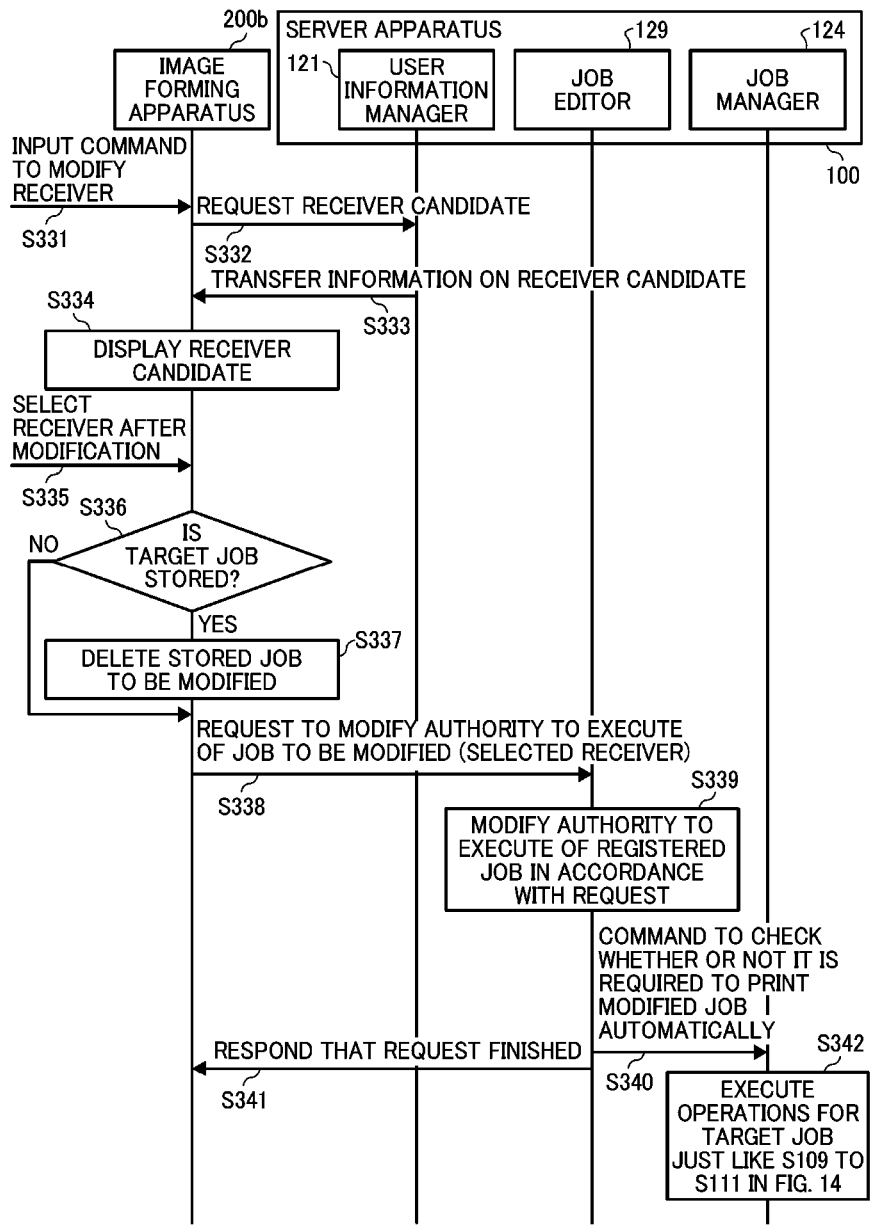
FIG. 28 is a sequence chart illustrating an operation executed by the image forming apparatus 200b and the server apparatus 100 if the image forming apparatus 200b detects a command to modify a receiver.

Next, FIG. 28 is a diagram illustrating an operation if the image forming apparatus 200b detects an instruction for modifying a receiver by using the transfer button 515. The instruction for modifying a receiver is also performed after specifying a job whose receiver is to be modified.

After detecting the instruction for modifying a receiver from the login user in S331, in the image forming apparatus 200b, the receiver modification command unit 237 requests the user information manager 121 in the server apparatus 100 to transfer information on candidates for a receive after the modification in S332.

After receiving the request, the user information manager 121 returns required information such as a user name and user identification managed by the user information manager 121 itself to the image forming apparatus 200b as the information on the candidates for a new receiver in S333. In this case, it is possible to return information on users only extracted in accordance with a condition such as limiting to users in the same department as the user who is logging in the image forming apparatus 200b etc.

After receiving the reply, in the image forming apparatus 200b, the receiver modification command unit 237 and the operation acceptance unit 234 display the receiver selection screen described above on the display 207 and accept selecting a new receiver after the modification among the received candidates for a new receiver in S334. It is possible to accept selecting multiple users in this case. In this case, it is assumed that the job registered in the server apparatus 100 is executed by a user who logs in any one of the image forming apparatus 200. Therefore, it is possible to select a new receiver among the candidates transferred by the user information manager 121 (i.e., users who can log in the image forming apparatus 200) only.

After detecting the selection of the new receiver after the modification from the login user in S335, in the image forming apparatus 200b, the job manager 232 determines whether or not the job whose receiver is to be modified has already been stored in the image forming apparatus 200b in S336. If the job is stored, the job is deleted in S337. The image forming apparatus 200b stores a job to have a current receiver receive a document of the job. Therefore, if the receiver is changed, it is unnecessary to store the job any more. In order to have the new receiver after the modification receive the document, it is possible that the same image forming apparatus 200b holds the job again in S342. In case of NO in S336, the step S337 is skipped.

In either case, next, in the image forming apparatus 200b, regarding the job related to the modification notification detected in S331, the receiver modification command unit 237 requests the job editor 129 in the server apparatus 100 to change the user who has authority to execute from the login user into the selected receiver this time in S338.

After receiving the request, the job editor 129 modifies the execution authority of the job registered in the job registration table in FIG. 9 in accordance with the request in S339 and requests the job manager 124 to check whether or not it is required to execute the modified job automatically in S340. In addition, results of these operations are returned to the image forming apparatus 200b in S341. In S339, regarding a job that multiple users have authority to execute, among them, it is possible to change the user who is logging in only into the receiver selected this time. If the receiver selected this time already has execution authority, it is possible to delete the execution authority of the user who is logging in only.

After receiving the instruction in S340, the job manager 124 performs the same operation as in S109 to S111 in FIG. 14 regarding the job requested to check. That is, in accordance with the location of the new user after the modification and the automatic print settings, operations such as preparing to print and printing automatically etc. are performed. If multiple users have authority to execute the target job, job editor 129 reports to the job manager 124 that the user whose execution authority is modified is included in the multiple users, and it is possible to perform operations such as preparing to print and printing automatically for the target user only.

Figure 29:
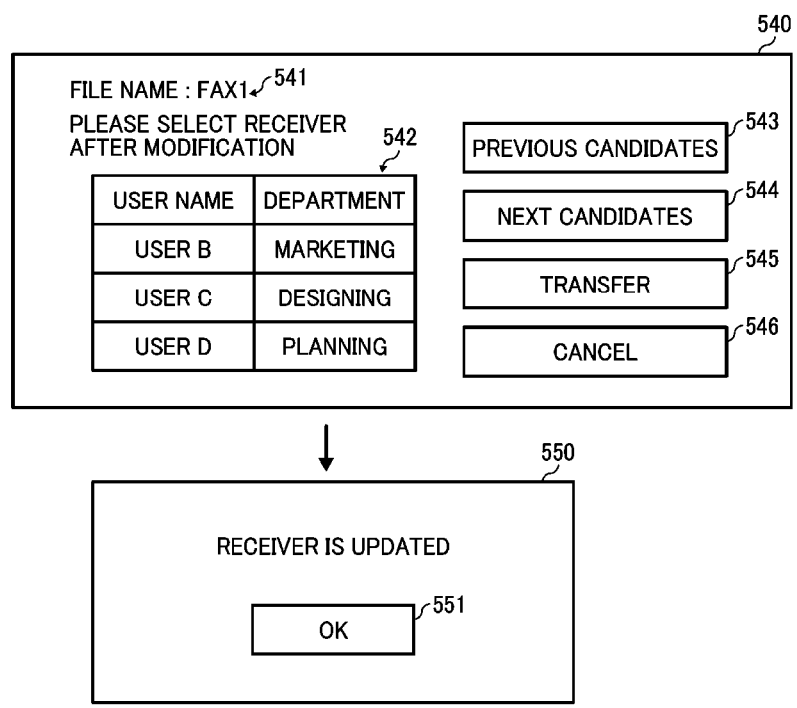
FIG. 29 is a diagram illustrating a receiver selecting screen and a modification completed screen.

FIG. 29 is a diagram illustrating the receiver selection screen displayed in S334 and the modification completion screen displayed in accordance with the completion response in S341.

In FIG. 29, the receiver selection screen 540 includes a file name display part 541, a candidate display part 542, a previous candidate button 543, a next candidate button 544, an execute transfer button 545, and a cancel button 546.

Among the components described above, the file name display unit 541 is an area that displays a file name of a job as a target of the operation of modifying a receiver. In addition, it is possible do display other bibliographic information such as a current receiver, source, and received date/time etc.

The candidate display area 542 is an area that displays candidates for a new receiver after the modification based on the information received in S333. In FIG. 29, a user name and department are displayed. However, it is possible to display information on other items. By touching a line corresponding to each user on the candidate display part 524 by user operation, it is possible to toggle the selection of the user on that line between selected and unselected.

The previous candidate button 543 and the next candidate button 544 are buttons to accept an instruction for displaying other candidates in the candidate display part 542.

The execute transfer button 545 is a button to accept an instruction for deciding the receiver selected currently as the new receiver after the modification.

The cancel button 546 is a button for accepting an instruction for canceling the modification of the receiver and going back to the job list screen 510'.

If the execute transfer button 545 is pressed on the receiver selection screen 540, the image forming apparatus 200b determines that the selection in S335 is performed and performs the operation after S336. Subsequently, after receiving the completion response in S341, the modification completion screen 550 is displayed on the display 207.

The modification completion screen 550 is a screen for reporting to the user that it is succeeded to modify the receiver of the job. Subsequently, after the OK button 551 is pressed by user operation, the image forming apparatus 200b closes the modification completion screen 550 and goes back to the job list screen 510'.

In this case, it is possible that the login user loses authority to execute some of the jobs in accordance with the modification of the receiver. Therefore, it is preferable to update the display of the job list screen 510' in accordance with the content of the completion response or after performing the operation in FIG. 24 again.

It is possible that the receiver is modified for jobs whose source is different from the login user himself/herself only. Otherwise, it is possible that the receiver is also modified for jobs whose source is the login user himself/herself. In the former case, the operation of modifying the receiver described above is to redistribute the document transferred wrongly to the correct destination. In the latter case, it is also possible to distribute the document registered for the user himself/herself to another user after the registration. Anyhow, these purposes can be achieved by performing the operation in FIG. 28.

Figure 30:
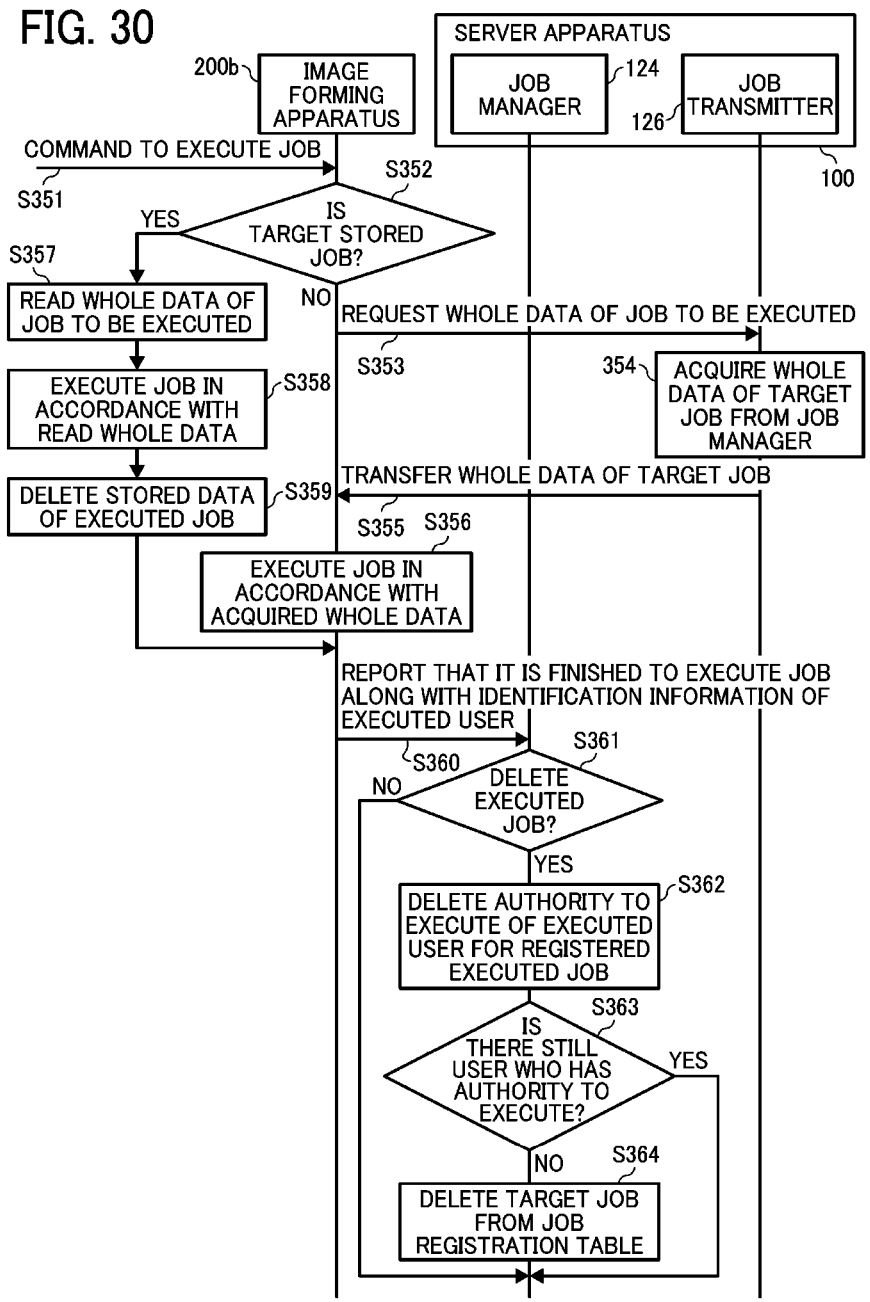
FIG. 30 is a sequence chart illustrating an operation executed by the image forming apparatus 200b and the server apparatus 100 if the image forming apparatus 200b detects a command to execute a job.

Next, FIG. 30 is a diagram illustrating an operation in case the image forming apparatus 200*b* detects the instruction for executing a job using the print button 512. The instruction for executing a job is performed specifying the job to be executed. The operation in FIG. 30 remains the same whether or not the source of the job to be executed is the login user himself/herself. In case of executing multiple jobs, it is possible to perform the operation in FIG. 30 for each of the multiple jobs.

After detecting the instruction for executing a job from the login user in S171, in the image forming apparatus 200*b*, the job manager 232 determines whether or not the job to be executed has already been stored in the image forming apparatus 200*b* in S352. Here, if the job is not stored, just like the case in S280 to S283 in FIG. 21, the instructed job is executed in S353 to S356.

By contrast, if the job is stored in S352, in the image forming apparatus 200*b*, the job manager 232 reads whole data of the job instructed to execute in S357, and the job executor 235 executes the job in accordance with the read whole data in S358. Subsequently, if the job is executed normally, the job manager 232 deletes the stored data of the executed job in S359.

In case of YES or NO in S352, after finishing executing the job, in the image forming apparatus 200*b*, the job executor 235 reports to the job manager 124 in the server apparatus 100 that it is finished to execute the job along with the identification information of the user who executed the job (i.e., login user in this case) in S360.

After receiving the notification, the job manager 124 determines whether or not it is configured that the executed job is to be deleted by the deletion setting unit 130 in S361. In case of NO in S361, the job information in the job manager 124 is not modified, and the operation in FIG. 30 ends. In this case, if a deleting operation or modifying operation is not performed separately, it is reported that the same job exists again when the user who executed the job logs in next time.

By contrast, in case of YES in S361, the job manager 124 deletes the execution authority of the user who executed the job this time regarding the job finished executing registered in the job registration table in FIG. 9. Subsequently, it is determined whether or not a user who has authority to execute the job still exists in S363. If there is no such user, the registration of the target job itself is also deleted in S364. By contrast, if such user who has the execution authority still exists, the registration is kept as is.

As described above, the operation in FIG. 30 ends.

As described above, if the job registered in the job manager 124 is executed by user operation, the server apparatus 100 can delete the execution authority of the user regarding the job. In addition, if there is no user who has the execution authority after performing the operation described above, it is possible to delete the registration of the job.

As a result, it is possible to prevent the executed job from being presented to the same user repeatedly. If it is known that only one user has authority to execute, it is possible to delete the registration of the job itself in S362.

The deletion setting unit 130 configures to be able to turn the deletion described above enabled or disabled. If it is inconvenient to perform the deletion automatically in case it is wanted to distribute to another user after printing the document and checking the content etc., it is preferable to turn the deletion disabled.

Next, FIG. 31 is a diagram illustrating an operation in case the image forming apparatus 200*b* detects the instruction for deleting a job using the delete button 516. The instruction for deleting a job is performed specifying the job to be deleted.

After detecting the instruction for deleting a job from the login user in S371, in the image forming apparatus 200*b*, the job manager 232 determines whether or not the job to be deleted has already been stored in the image forming apparatus 200*b* in S372. If the job is stored, the job manager 232 deletes the data of the job to be deleted stored in the image forming apparatus 200*b* in S373. If the job is not stored, the step S373 is skipped.

Next, in the image forming apparatus 200*b*, the job deletion command unit 238 requests the job editor 129 in the server apparatus 100 to delete the execution authority of the login user regarding the target job in S374. It is preferable to attach the identification information of the login user to the request.

After receiving the request, in accordance with the request, the job editor 129 deletes the execution authority of the target user regarding the target job registered in the job registration table in FIG. 9. Subsequently, it is determined whether or not a user who has authority to execute the job still exists in S376. If there is no such user, the registration of the target job itself is also deleted in S377. By contrast, if such user who has the execution authority still exists, the registration is kept as is.

After performing the operation described above, the job editor 129 returns the deletion result to the image forming apparatus 200*b* in S378, and the operation in FIG. 31 ends.

As described above, it is possible to prevent an executed job and a job determined as unnecessary after checking its preview from being displayed in logging in by user operation. However, regarding a job that another user still has authority to execute, the job is displayed when the user logs in.

Therefore, it is possible to request to delete not only the execution authority of the login user himself/herself but also the job itself. This is because, regarding clearly unnecessary jobs, it is unnecessary to present the jobs to other users in first place.

In case of pressing the delete button 516 by user operation, it is preferable to display the deletion confirmation screen 560 in FIG. 32 on the display 207 to confirm the user intention.

On the deletion confirmation screen 560, information on the job selected as the job to be deleted is displayed. By pressing the OK button 561 by user operation, it is possible to request to perform the deletion. By pressing the cancel button 562, it is possible to request to cancel the deletion and go back to job list screen 510'.

Other Embodiments

In the embodiments described above, the specific configuration of the apparatuses, the specific sequence of the processes, the number of apparatuses, the data configuration, the type of the jobs to be handled, and the type of the communication networks to be used etc. are not limited to the above description.

For example, the entering/leaving information acquisition apparatus 400 not only acquires the entering/leaving information indicating that the user enters into the specific area and the user leaves from the specific area as described in the embodiments above but also grasps the user location. For example, the entering/leaving information acquisition apparatus 400 receives information on the current location detected by the Global Positioning System (GPS) sensor etc. in the terminal apparatus held by the user and provides the location information to the server apparatus 100. In this case, if the server apparatus 100 grasps location information for each area, by comparing the location information with the location information provided by the entering/leaving information acquisition apparatus 400, it is possible to specify which area the user who holds the terminal apparatus is located (or the user is not located in any area). In case of adopting the configuration described above, it is unnecessary to lay out the entering/leaving information acquisition apparatus 400 associated with each area. In addition, in defining areas, it is possible to define areas as a range of coordinate values.

In the embodiments described above, the image forming system includes multiple image forming apparatuses 200. However, it is possible that the image forming system includes only one image forming apparatus 200.

In addition, it is possible that multiple image forming apparatuses 200 that implement facsimile function are included in the image forming system. In this case, it is possible that the distribution table defines receiver users just like in FIG. 7 for each of receiving apparatuses. In this case, in S106 in FIG. 14, the server apparatus 100 specifies the receiver user by using the identification information of the image forming apparatus 200a that received the document (i.e., that requests to estimate) too.

In addition, it is possible that any one of the image forming apparatuses 200 also functions as the server apparatus 100.

In addition, it is possible to distribute functions of the image forming apparatus 200 and the server apparatus 100 to multiple apparatuses to have those apparatuses to cooperate with each other to function as the image forming apparatus 200 or the server apparatus 100.

In addition, it is possible to share functions between the image forming apparatus 200 and the server apparatus 100 in ways different from the case described in the embodiments above.

The image forming apparatus 200 can form an image using methods other than printing.

Regarding jobs other than the image forming job (i.e., in this paragraph, "job" is not limited to the image forming job), it is also possible to handle those jobs in a way same as the image forming job described above. In this case, it is possible that the job has completely no relationship with image formation and image processing. In that case, it is unnecessary that an apparatus that acquires a job, registers the job in the server apparatus 100, and acquires the job from the server apparatus 100 to execute the job implements an image forming function and an image processing function. In that case, a generic information processing apparatus such as a PC can be used. In addition, an information processing apparatus or a communication apparatus including hardware required for executing a job can be used. An information processing system that handles jobs can be constructed by using the server apparatus 100 and the information processing apparatus or the communication apparatus described above.

Programs in the embodiments of the present invention instruct the computer to control the hardware to implement the functions of any one of the image forming apparatuses 200a to 200c or the server apparatus 100 described in the embodiments.

It is possible to store these programs in the ROM or other nonvolatile storage media (e.g., flash memory and EEPROM etc.) included in the computer from the beginning. However, it is possible to provide those programs by storing those programs in any non-volatile storage medium such as a memory card, CD, DVD, and Blu-ray disc to distribute those programs. By installing those programs stored in those recording media in the computer and executing those programs, it is possible to implement the operations described above.

Furthermore, it is also possible to download those programs from an external apparatus that includes the recording medium storing those programs or an external apparatus that stores those programs in a storage unit and install those programs in the computer to execute those programs.

In addition, configurations described in the above embodiments can be combined arbitrarily and implemented as long as they do not contradict with each other of course.

In the embodiments described above, a novel image forming system that it is possible that a receiver receives a document transferred by a sender electrically as a sheet on which an image is formed safely and easily is provided.

The present invention also encompasses a non-transitory recording medium storing a program that executes an information processing method. The information processing method includes the steps of registering an image forming job that is received from one of the image forming apparatuses in association with information on a user who has authority to execute the image forming job, acquiring information on a location of the user, determining whether or not the user is located at a first area based on the information on the location of the first user to generate a first determination result, and determining an operation to be performed on the image forming job based on the first determination result.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein.

The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An image forming system, comprising:
   one or more image forming apparatuses;
   one or more user location sensors positioned proximate to one or more entryways; and
   an information processing apparatus connected to the one or more image forming apparatuses through a network, the information processing apparatus including first circuitry to,
      determine a user having authority to execute an image forming job based on a source of the image forming job and a network type, the image forming job being received from a first requesting image forming apparatus of the one or more image forming apparatuses,
      register the image forming job in association the user,
      acquire user location information associated with the user, the user location information having been generated by the one or more user location sensors,
      determine whether the user is located in a first area based on the user location information to generate a first determination result, and
      determine an operation to be performed on the image forming job based on the first determination result.

2. The image forming system according to claim 1, wherein
   the image forming job is received by the first requesting image forming apparatus from the source via a network corresponding to the network type; and
   the first circuitry is further configured to,
      acquire image forming apparatus location information associated with a location of each of the one or more image forming apparatuses,
      select a first selected image forming apparatus of the one or more image forming apparatuses corresponding to the user location information using the image forming apparatus location information when the first determination result indicates that the user is located at the first area, and
      transfer the image forming job to the first selected image forming apparatus to cause the first selected image forming apparatus to store the image forming job in a memory.

3. The image forming system according to claim 2, wherein the first circuitry is further configured to:

determine whether the user is located in a second area within the first area to generate a second determination result when the first determination result indicates that the user is located in the first area;
select a second selected image forming apparatus of the one or more image forming apparatuses located in the second area using the image forming apparatus location information when the second determination result indicates that the user is located in the second area; and
transfer the image forming job to the second selected image forming apparatus with a request for executing the image forming job, to cause the second selected image forming apparatus to form an image based on the image forming job.

4. The image forming system according to claim 3, wherein the first circuitry is further configured to define a range of the second area in accordance with user instruction, the user instruction including an instruction to set each area where the image forming apparatus is located in the first area as the second area.

5. The image forming system according to claim 3, wherein the first circuitry is further configured to report information identifying the second selected image forming apparatus, and an indication that the second selected image forming apparatus is requested to execute the image forming job, to a destination associated with the user when the information processing apparatus transfers the request to the second selected image forming apparatus.

6. The image forming system according to claim 2, wherein the first circuitry is further configured to:
   acquire information indicating that the user has left an area where the first selected image forming apparatus is located; and
   request the first selected image forming apparatus to delete the image forming job from among one or more stored image forming jobs.

7. The image forming system according to claim 2, wherein the first circuitry is further configured to request, in response to transferring the image forming job to the first selected image forming apparatus, the first selected image forming apparatus to transition from an energy-saving mode to a normal operation mode.

8. The image forming system according to claim 2, wherein
   the information processing apparatus further includes a memory configured to store first configuration information indicating the operation to be performed; and
   the first circuitry is further configured to prohibit transferring of the image forming job when the first configuration information indicates that the image forming job should not be transferred when the first determination result indicates that the user is located in the first area.

9. The image forming system according to claim 8, wherein, the first circuitry is further configured to suspend the image forming job until the first determination result indicates the user is located in the first area when the first determination result indicates that the user is not located at the first area and the first configuration information indicates that the image forming job should be suspended.

10. The image forming system according to claim 9, wherein
   the information processing apparatus further includes a memory configured to store second configuration information indicating the operation to be performed when the first determination result indicates that the user is not located in the first area; and the first circuitry is further configured to
prohibit the suspension of the image forming job when the second configuration information indicates that the image forming job should not be transferred and the first determination result indicates that the user is not located in the first area, and
register the image forming job.

11. The image forming system according to claim 9, wherein
the information processing apparatus further includes a memory configured to store second configuration information indicating the operation to be performed when the first determination result indicates that the user is not located in the first area; and
the first circuitry is further configured to transfer the image forming job to an specific image forming apparatus of the one or more image forming apparatuses with a request for executing the image forming job when the second configuration information indicates that the specific image forming apparatus should be caused to execute the image forming job and the first determination result indicates that the user is not located in the first area.

12. The image forming system according to claim 11, wherein the first circuitry is further configured to report information for identifying the specific image forming apparatus, and an indication that the specific image forming apparatus has been requested to execute the image forming job, to a destination associated with the user in response to the first circuitry transferring the request for executing the image forming job to the specific image forming apparatus.

13. The image forming system according to claim 2, wherein the first circuitry is further configured to:
identify the first selected image forming apparatus corresponding to the user location information based on the user location information; and
suspend the image forming job until the first selected image forming apparatus is identified.

14. The image forming system according to claim 13, wherein
the information processing apparatus further includes a memory configured to store third configuration information indicating the operation to be performed when the first determination result indicates that the user is located in the first area and the first selected image forming apparatus has not been identified; and
the first circuitry is further configured to
prohibit the suspension of the image forming job when the third configuration information indicates that the image forming job should not be transferred, the first determination result indicates that the user is located in the first area, and the first selected image forming apparatus has not been identified, and
register the image forming job.

15. The image forming system according to claim 2, wherein
the first circuitry is further configured to authenticate the user based on authentication information input by the user into the first selected image forming apparatus, and
the first selected image forming apparatus includes second circuitry configured to transitions to a state that does not accept user operation when the image forming apparatus location information associated with the first selected image forming apparatus does not correspond to the user location information associated with the authenticated user.

16. The image forming system according to claim 2, wherein the one or more image forming apparatuses each include second circuitry and the second circuitry in the first selected image forming apparatus is configured to:
authenticate the user based on authentication information input by the user; and
report information for identifying the first selected image forming apparatus, and an indication that the location of the first selected image forming apparatus does not match the user location information associated with the authenticated user, to a destination associated with the authenticated user when the image forming apparatus location information associated with the first selected image forming apparatus does not correspond to the user location information associated with the authenticated user.

17. The image forming system according to claim 2, wherein
the first circuitry is further configured to register, for each image forming job, information on the source in association with the image forming job and the user; and
the one or more image forming apparatuses each include second circuitry and the second circuitry in the first selected image forming apparatus is configured to
authenticate the user,
receive information on one or more registered image forming jobs that the authenticated user has authority to execute, from the information processing apparatus, and
present, to the authenticated user, the one or more registered image forming jobs and the image forming job stored in the memory, as image forming jobs that the authenticated user has authority to execute,
wherein, among the image forming jobs that are presented, an image forming job for which the source is not the authenticated user is displayed preferentially compared to another image forming job among the image forming jobs that the authenticated user has authority to execute.

18. The image forming system according to claim 1, wherein the one or more image forming apparatuses each include second circuitry, and the first circuitry and the second circuitry both include a processor or controller that executes stored instructions.

19. An information processing apparatus, comprising circuitry to:
determine a user having authority to execute an image forming job based on a source of the image forming job and a network type, the image forming job being received from a first requesting image forming apparatus of one or more image forming apparatuses;
register the image forming job in association with the user;
acquire user location information associated with the user, the user location information having been generated by one or more user location sensors positioned proximate to one or more entryways;
determine whether the user is located in a first area based on the user location information to generate a first determination result; and
determine an operation to be performed on the image forming job based on the first determination result.

20. An information processing method comprising:
determining a user having authority to execute an image forming job based on a source of the image forming job and a network type, the image forming job being received from a first requesting image forming apparatus of one or more image forming apparatuses;

registering the image forming job in association with the user;

acquiring user location information associated with the user, the user location information having been generated by one or more user location sensors positioned proximate to one or more entryways;

determining whether the user is located in a first area based on the user location information to generate a first determination result; and determining an operation to be performed on the image forming job based on the first determination result.

* * * * *